(12) United States Patent
Stevens

(10) Patent No.: US 8,396,756 B1
(45) Date of Patent: Mar. 12, 2013

(54) SYSTEM AND METHOD FOR PROCESSING PRODUCT ORDERS

(75) Inventor: Edward Allen Stevens, San Luis Obispo, CA (US)

(73) Assignee: Shopatron, Inc., San Luis Obispo, CA (US)

( * ) Notice: Subject to any disclaimer, the term of this patent is extended or adjusted under 35 U.S.C. 154(b) by 2261 days.

(21) Appl. No.: 10/238,378

(22) Filed: Sep. 10, 2002

Related U.S. Application Data

(60) Provisional application No. 60/318,940, filed on Sep. 11, 2001.

(51) Int. Cl.
*G06Q 30/00* (2006.01)
(52) U.S. Cl. .............. 705/26.4; 705/26.1; 705/26.3
(58) Field of Classification Search ............ 705/26, 705/27
See application file for complete search history.

(56) References Cited

U.S. PATENT DOCUMENTS

| | | | |
|---|---|---|---|
| 5,845,265 A | 12/1998 | Woolston | |
| 6,085,176 A | 7/2000 | Woolston | |
| 6,202,051 B1 | 3/2001 | Woolston | |
| 6,249,772 B1* | 6/2001 | Walker et al. | 705/26 |
| 6,260,024 B1* | 7/2001 | Shkedy | 705/37 |
| 6,263,317 B1 | 7/2001 | Sharp et al. | |
| 6,453,352 B1 | 9/2002 | Wagner et al. | |
| 6,754,636 B1* | 6/2004 | Walker et al. | 705/26 |
| 7,062,451 B1* | 6/2006 | Dentel et al. | 705/26 |
| 2003/0023499 A1* | 1/2003 | Das et al. | 705/26 |

OTHER PUBLICATIONS

Brochure of Freemarkets, Inc. (Aug. 2001).
Information from ebay.com website about eBay Inc. founded in Sep. 1995.

\* cited by examiner

*Primary Examiner* — M. Thein
(74) *Attorney, Agent, or Firm* — Fish & Richardson P.C.

(57) ABSTRACT

A method of processing a product order is disclosed. The method includes receiving a product order from a consumer and selecting a fulfiller to fulfill the product order. A system for processing a product order is also disclosed.

20 Claims, 29 Drawing Sheets

SYSTEM AND METHOD FOR PROCESSING PRODUCT ORDERS

This disclosure claims priority under 35 U.S.C. 119(e) to U.S. Provisional Application No. 60/318,940 which was filed Sep. 11, 2001 and is hereby incorporated by reference herein.

FIELD OF THE DISCLOSURE

This disclosure relates to the marketing and sale of products via a network, such as the internet. It is disclosed in the context of certain embodiments and utilities, but is believed to be useful in other applications as well.

BACKGROUND OF THE DISCLOSURE

Methods utilizing computers to sell products, for example, selling products via a network, such as the internet, are in widespread use. Traditionally, products are distributed from a manufacturer to a consumer through a series of intermediaries, each which has a particular business function. The most common intermediaries are known as "distributors" and "retailers". Distributors purchase products in large quantities from manufacturers and resell the products in smaller quantities to retailers. Retailers, in turn, resell the products to consumers. In addition to selling products to consumers, retailers may also provide additional services, such as purchase advice and technical support. These services are typically not provided by manufacturers or distributors.

Generally, distributors and retailers carry products from several manufacturers. Usually, but not always, distributors operate at a national level, while retailers operate at a local level. A retailer may place an order with a distributor for products from a variety of manufacturers, which may be sent as a single shipment. This reduces the overall cost of shipping. In some industries, the line between distributors and retailers is blurred. Some distributors sell directly to consumers, and some retailers purchase directly from manufacturers. Therefore, hereinafter the terms "distributor" and "retailer" will be used interchangeably to describe all intermediaries.

Retailers benefit from the traditional method of distribution because they can purchase a variety of products from different manufacturers without contacting each manufacturer directly to arrange individual product shipments. Manufacturers benefit because they can ship their products in bulk without dealing with a multitude of retailers each having its own purchase and shipment policies and unknown risk of non-payment.

The fundamental rules of business require intermediaries to increase the price of goods they handle in order to cover their business expenses and create a profit margin. Manufacturers who sell through distributors and retailers generally offer a discounted price to distributors and retailers to cover expenses and profit thereby lowering their own profit margin. Without distributors and retailers, manufacturer would command a higher price for their goods and consumers would pay less. Both manufacturers and consumers would prefer to work directly together whenever practical in order to maximize manufacturer profits and minimize the consumer costs.

The realities of business, however, have until recently prevented manufacturers and consumers from working closely together. Historically, it has not been possible to easily distinguish between consumers who need only the products and services offered by the manufacturer and those who need additional products and services offered by the retailer until after significant time has been spent by the retailer with the consumer. In addition, the cost of performing the traditional customer service functions of a retailer often outweigh the additional profit margin to the manufacturer gained by selling directly to the consumer. As a consequence, manufacturers tend to work primarily with distributors and retailers, and forgo the profit potential of consumer direct sales.

Further, selling directly to consumers can alienate local retailers that become aware of the manufacturer's direct marketing efforts, and are apt to view the manufacturer as a serious competitor instead of a business ally. Distributors and retailers, therefore, tend to avoid manufacturers with significant consumer direct sales. As a result, manufacturers tend to work primarily with distributors and retailers rather than risk losing their traditional distribution network.

Global networks, such as the internet, have revolutionized business by allowing manufacturers to communicate directly with consumers at very low cost. Consumers can order products directly from manufacturers, and manufacturers can fill these orders by shipping directly to the consumers. The problem remains, however, that dealing with all consumers directly is too expensive and too risky for most manufacturers. In addition, consumers continue to face the problem that ordering and shipping from multiple manufacturers is frequently more expensive and less convenient than purchasing from a single local retailer.

Some data interchange systems have been developed to link manufacturers, distributors and retailers so that information regarding orders from consumers can be shared electronically. These electronic and computer software systems link the computer databases of the manufacturers, distributors and retailers so they can share information including, for instance, inventory levels, product specifications, and expected shipping times. However, these prior art integrated systems are complex and expensive, so their use has been limited to relatively large companies. Therefore, small retailers, having no affordable, automatic system for sharing such information with distributors and manufacturers, are left to fill orders manually by traditional methods.

What is needed is a simple, automatic system which can identify whether an individual consumer is best suited to deal directly with a manufacturer or with a retailer, while additionally identifying the best method for distribution to minimize the final cost to the consumer, without disrupting the traditional distribution network already in place.

SUMMARY OF THE DISCLOSURE

In one illustrative embodiment of the present disclosure, a system and method for processing a product order includes multiple entry points for at least one consumer to place a product order.

According to one aspect of this embodiment, the system allows a manufacturer to either fill a product order or allow a number of retailers to fill the product order.

Further according to this aspect of this embodiment, when a manufacturer decides to allow a number of retailers to fill an order, information describing the order is "posted" on a web page that is accessible to the retailers. The web page allows the retailers to "bid" on (agree to fulfill the order for a predetermined order price) the order.

Further according to this aspect of this embodiment, if more than one retailer bids on an order, the system selects one retailer to fill the order, and, in some cases, confirms the transaction with the consumer and the selected retailer.

Retailer selection is based on multiple criteria including, for instance, geography, industry preferences, manufacturer preferences, and the number of orders previously filled by the respective retailer. The first selection criterion considered by the system is the ability of the retailer to ship the order complete (without backordering items). Then, based on geography, the system assigns the order to the closest retailer which bids on the order and which can fulfill the complete order. Manufacturers have the ability to deny specific retailers the chance to win an order in bidding based on the manufacturer's preferences.

In another illustrative embodiment of the present disclosure, a system for processing a product order operates independently from manufacturers and retailers.

According to one aspect of this embodiment, the system may select a combination of products from different manufacturers.

According to another aspect of this embodiment, the system may select any retailer to fill an order.

In another illustrative embodiment of the present disclosure, a system for processing a product order includes centralized financial functions to electronically transfer payment from the consumer to the manufacturer, and to extract administrative and transaction fees after the order has been processed.

In another illustrative embodiment of the present disclosure, a system for processing a product order includes a centralized mechanism for connecting a number of manufacturers, distributors, retailers and consumers, without requiring integration of the computer databases of the manufacturers, distributors, retailers or consumers.

In another illustrative embodiment of the present disclosure, a system for processing a product order provides a mechanism and method for generating information regarding consumer qualifications.

According to one aspect of this embodiment, the system determines a preferred method for filling an order for goods and/or services via at least one retailer.

In another illustrative embodiment of the present disclosure, a system for processing a product order provides a number of retailers with an opportunity to indicate a desire to fill consumer product orders that are directed to the retailers by a manufacturer.

In another illustrative embodiment of the present disclosure, a system for processing a product order provides for orders to be sent to the system from outside manufacturers by electronic sending. Orders can be sent in a specific format to the system without integration to the manufacturer. According to one aspect of this embodiment, the system can accept orders from member manufacturers and place those orders in the system for retailers to fulfill.

In another illustrative embodiment of the present disclosure, a system for processing a product order provides for orders that are waiting for fulfillment to be sent to member retailers based on retailer preferences.

According to one aspect of this embodiment the system can push orders to specific retailers based on the retailer's preferences in the system and their order history with the manufacturer.

According to another aspect of this embodiment the system can predict which retailers can fulfill the order and send the order to the retailer for acceptance and fulfillment.

In another illustrative embodiment of the present disclosure, a system for processing a product order provides for income redistribution on specific products of an order.

According to one aspect of this embodiment the system can collect a fixed percentage of a total product cost and credit that amount to a specific retailer based on that retailer's ability to fulfill an order for a manufacturer.

According to another aspect of this embodiment the system allows a manufacturer to set the redistribution percentage for each product in their own product line as it is ordered.

Further uses of the present disclosure will become apparent to persons skilled in the art to which the disclosure relates upon reading the following detailed description of an illustrative embodiment.

BRIEF DESCRIPTION OF THE DRAWINGS

The disclosure may best be understood with reference to the following detailed description and accompanying drawings which illustrate the disclosure. In the drawings.

DETAILED DESCRIPTION OF ILLUSTRATIVE EMBODIMENTS

Figure 1:
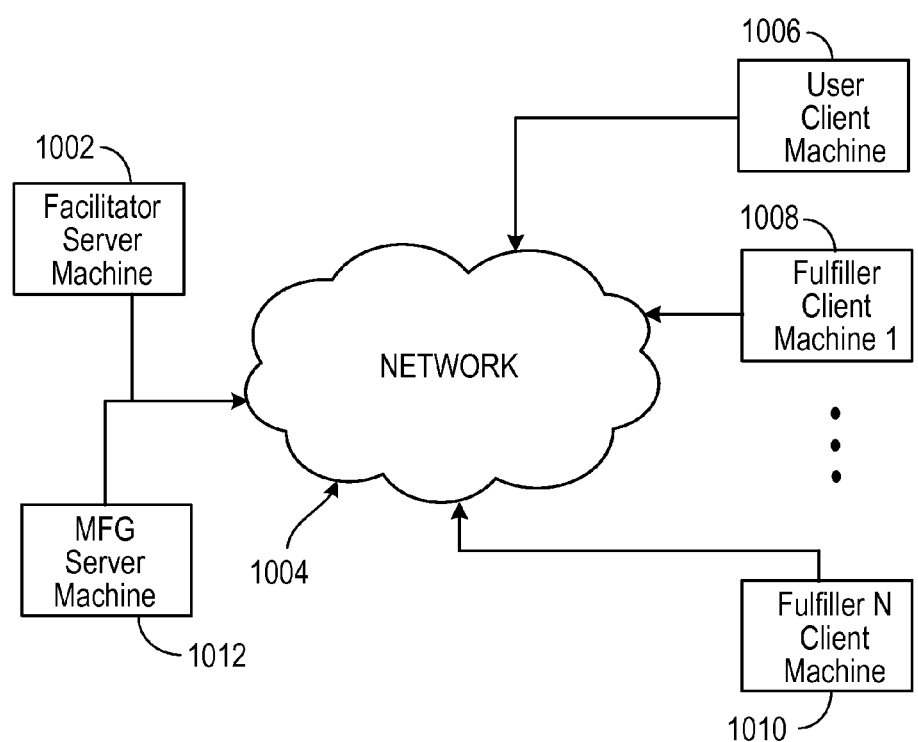
FIG. 1 illustrates a group of computers implementing a system.

Turning now particularly to FIG. 1, an order facilitator server machine (or simply "facilitator server") 1002 of a shopping service is coupled to network 1004. Network 1004 could be, for example, a publicly accessible global network, such as the Internet. A consumer accesses the system of the present disclosure as user 2006 via user client machine 1006. User client machine 1006 is coupled to network 1004. A distributor or a retailer accesses the system of the present disclosure as fulfiller 2008 via fulfiller client machine 1008 or 1010. Fulfiller clients 1008 and 1010 are coupled to network 1004. Clients 1006-1010 include software, such as a web browser, which enables them to process script languages and/or meta languages.

Manufacturer server machine 1012 interacts with client machines 1006 and 1008 to offer products for sale. However, when user 2006 selects a product for ordering, client machine 1006 or 1008 is redirected from manufacturer server 1012 to facilitator server 1002. Manufacturer server 1012 provides information to facilitator server 1002 regarding the order, such as, for example, the product to be ordered or information pertaining to user 2006. After client 1006 or 1008 is redirected to facilitator server 1002, facilitator server 1002 interacts with client machines 1006-1010 as explained below in reference to FIGS. 2-27. Alternatively, user 2006 may access facilitator server 1002 directly.

Alternatively, the order may be completed at the manufacturer server machine 1012. The consumer may select multiple products in one order. When the consumer has completed selecting products, manufacturer server machine 1012 sends client order to facilitator server 1002. The consumer is then redirected to facilitator server 1002 for order completion.

Figure 2:
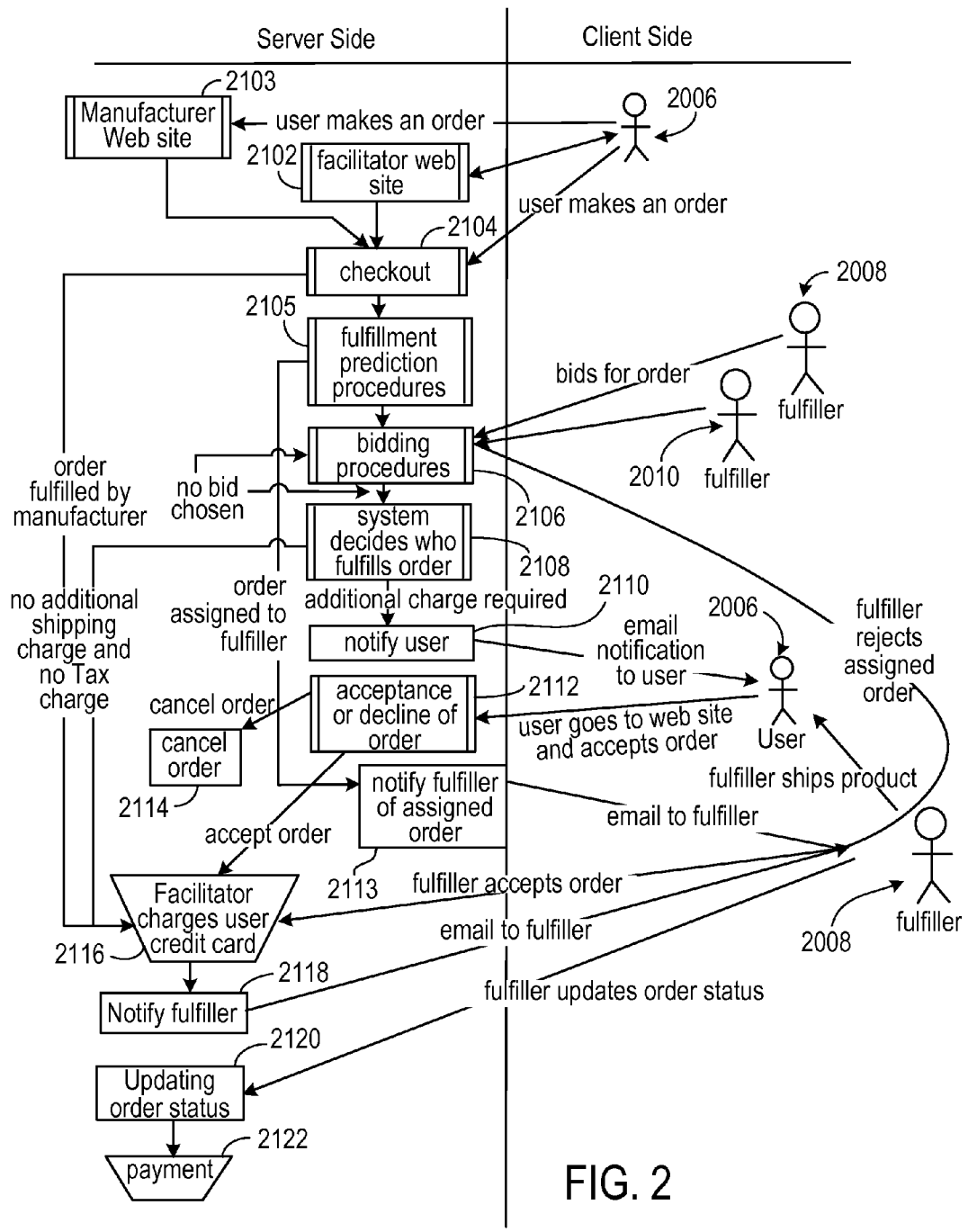
FIG. 2 illustrates a high level method of product distribution.
Figure 3:
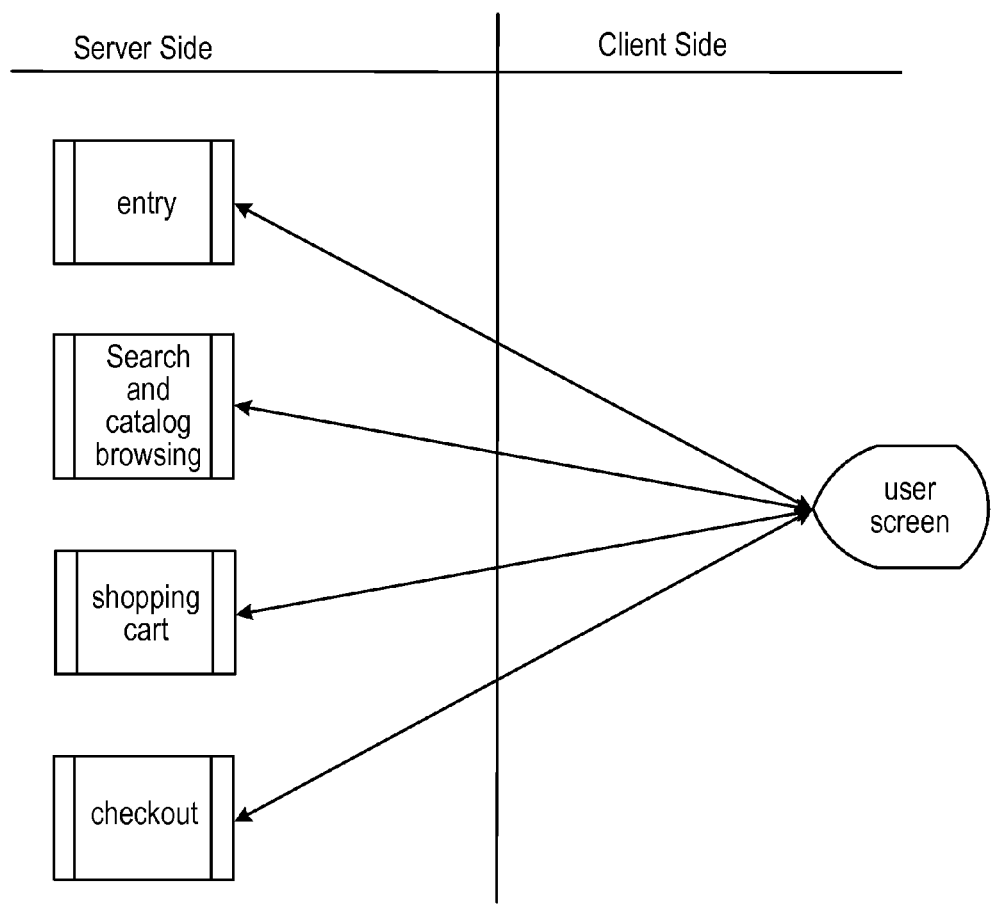
FIGS. 3-27 illustrate a method of product distribution.
Figure 4:
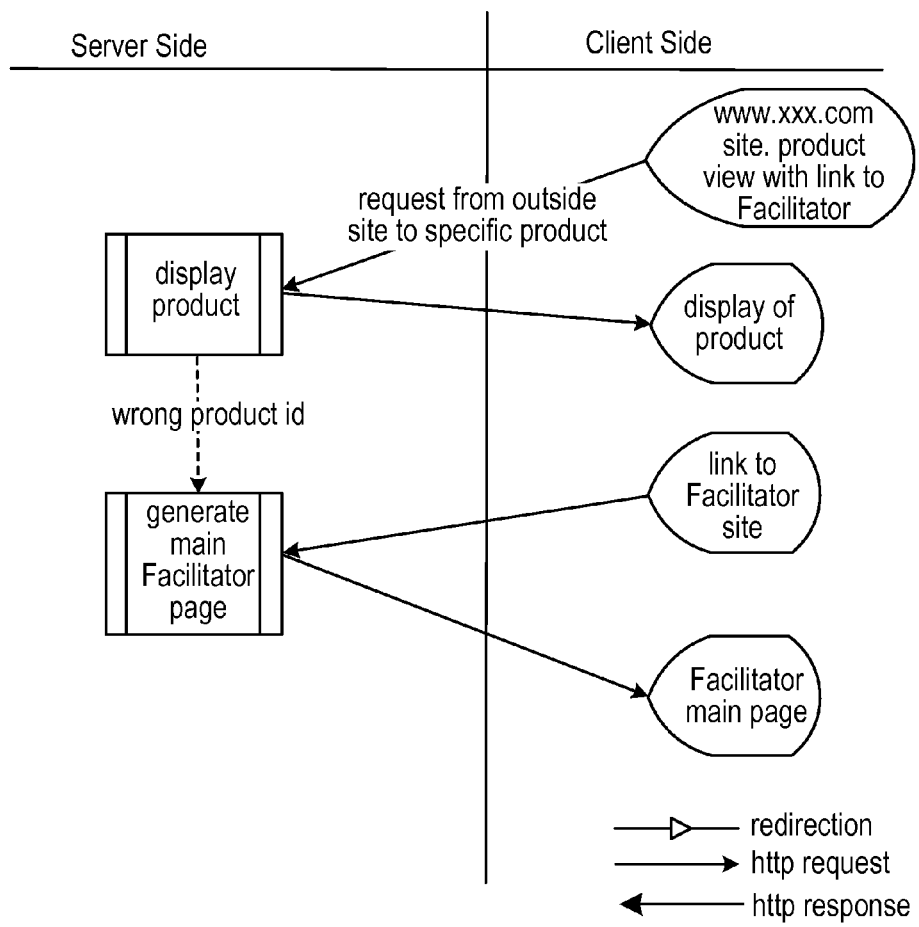
Figure 5:
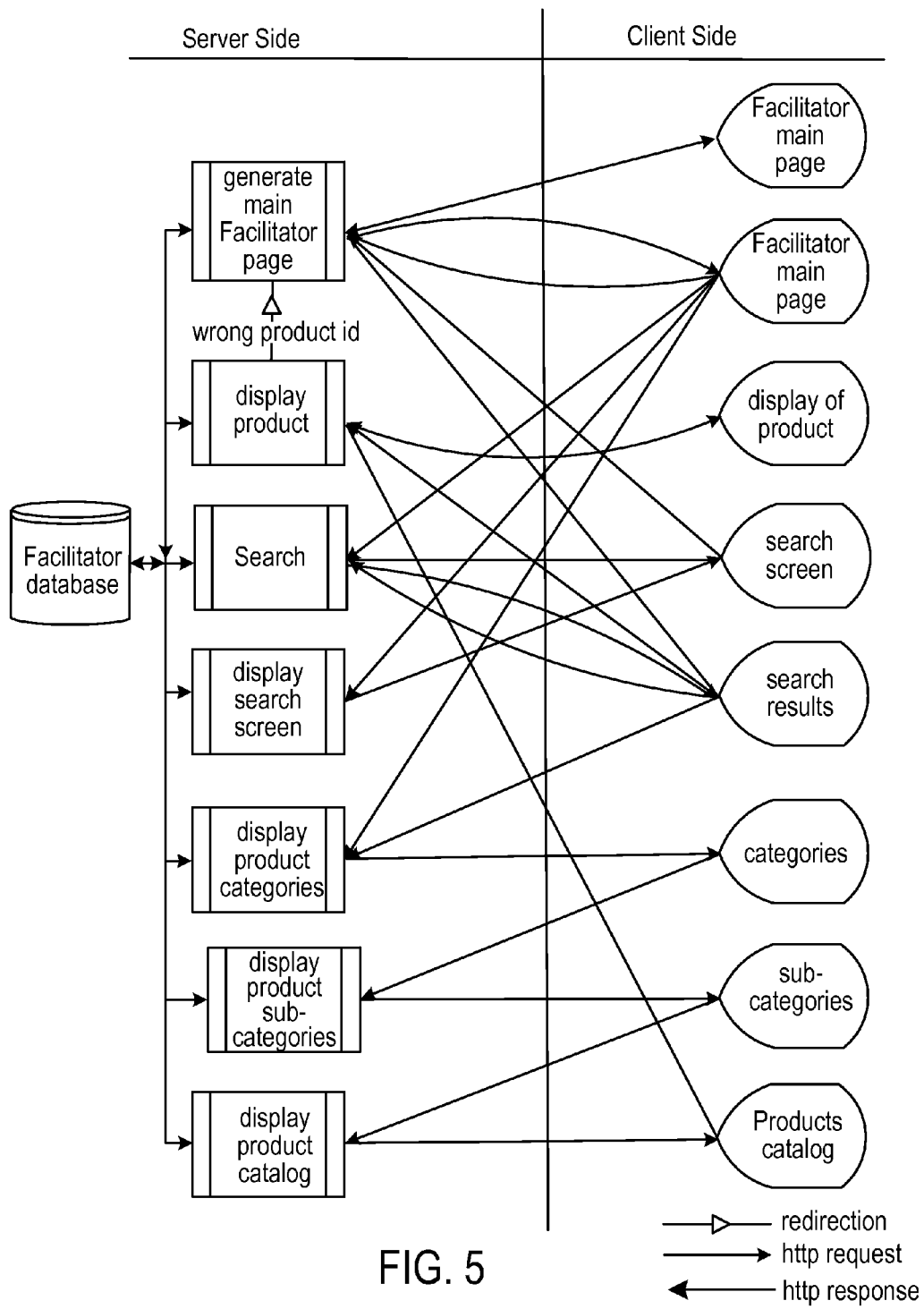
Figure 6:
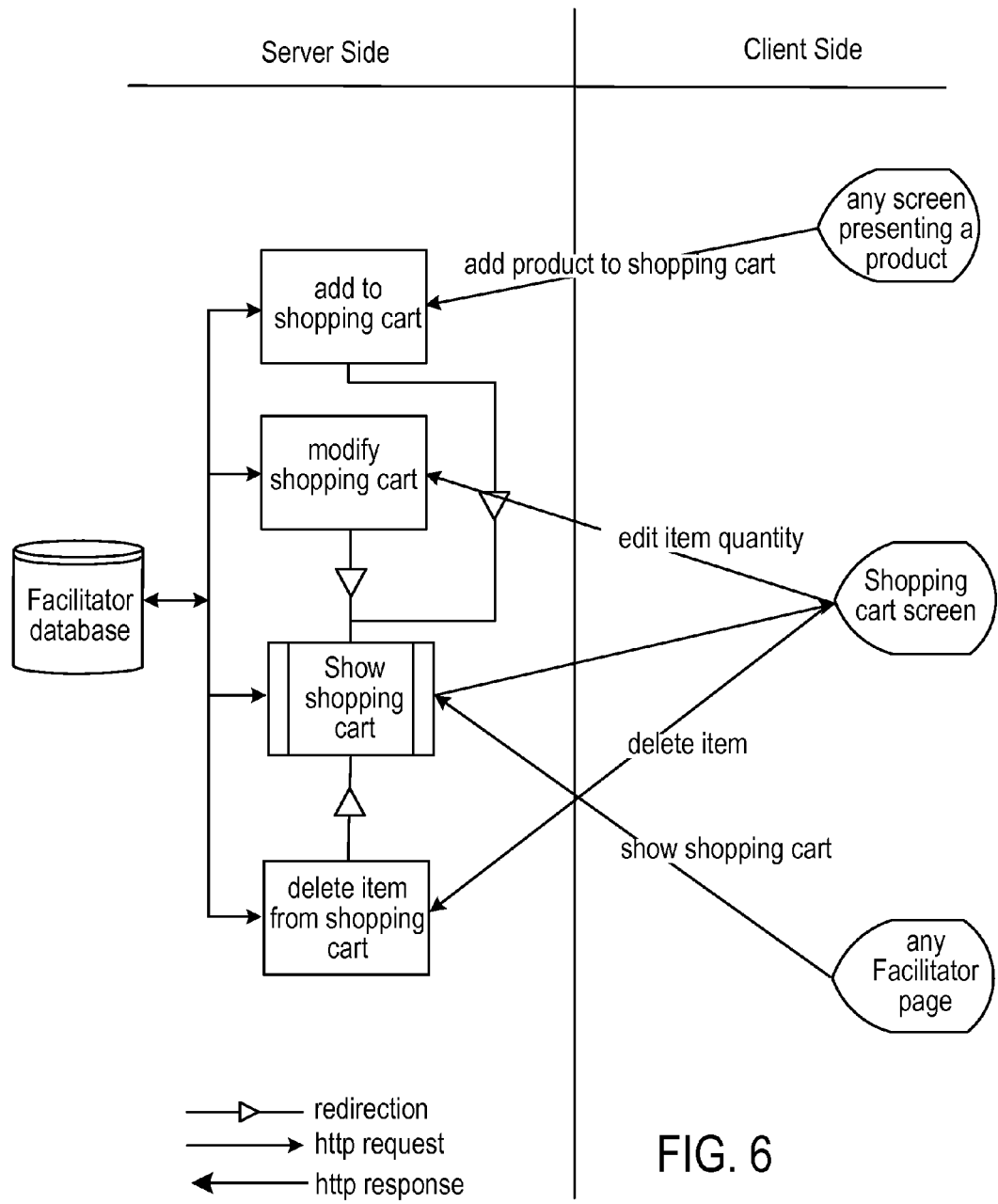
Figure 7:
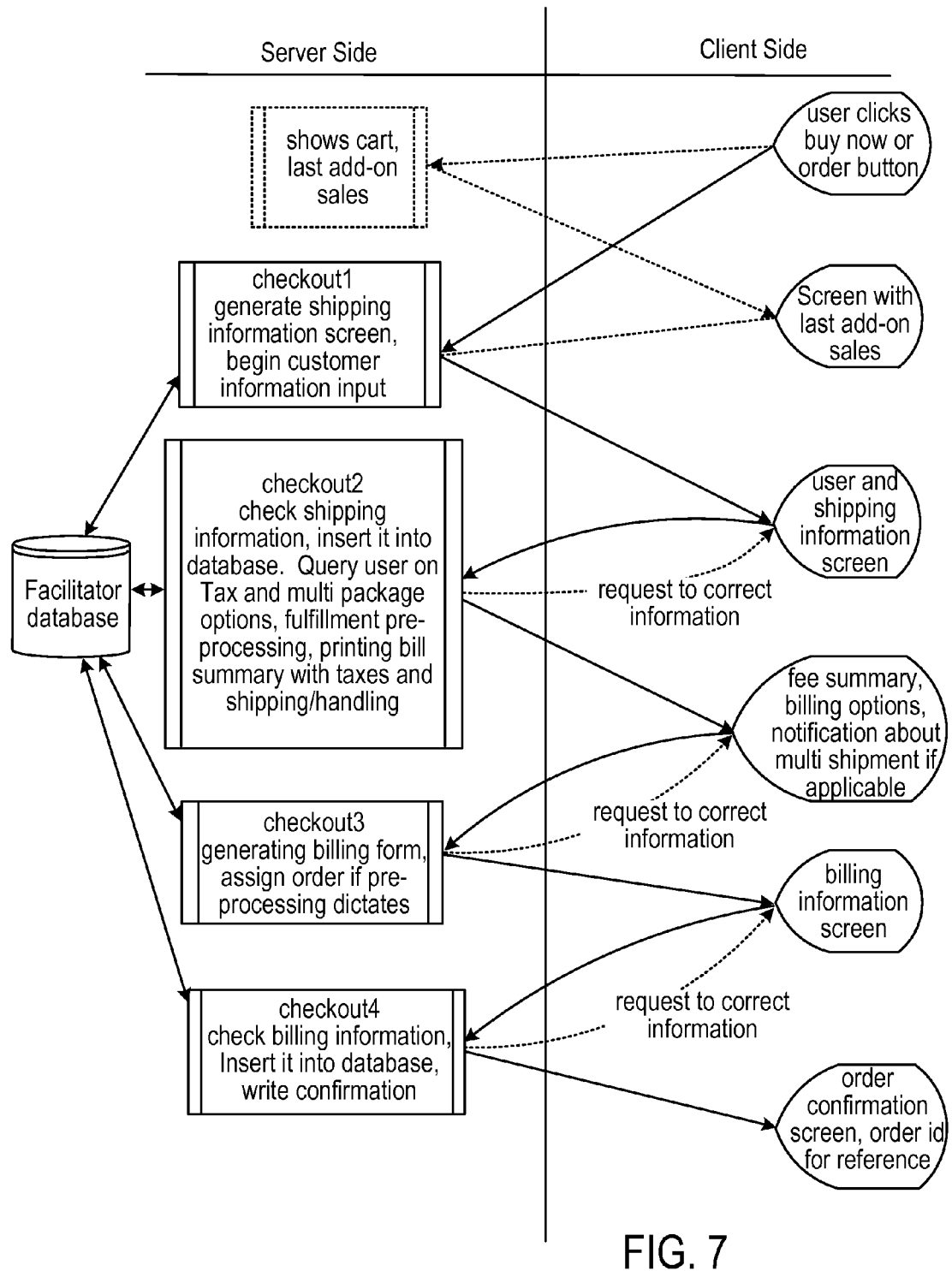
Figure 8:
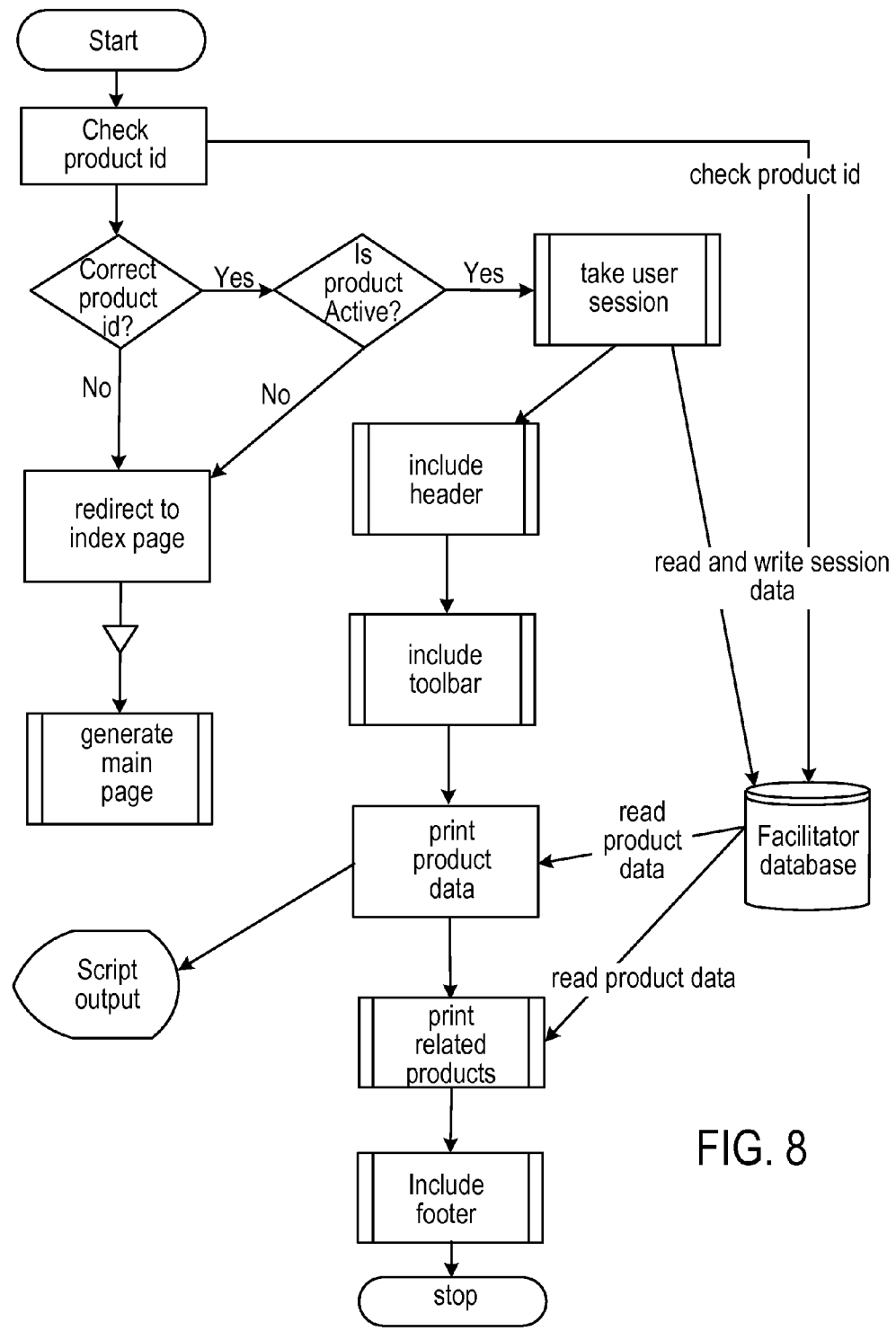
Figure 9:
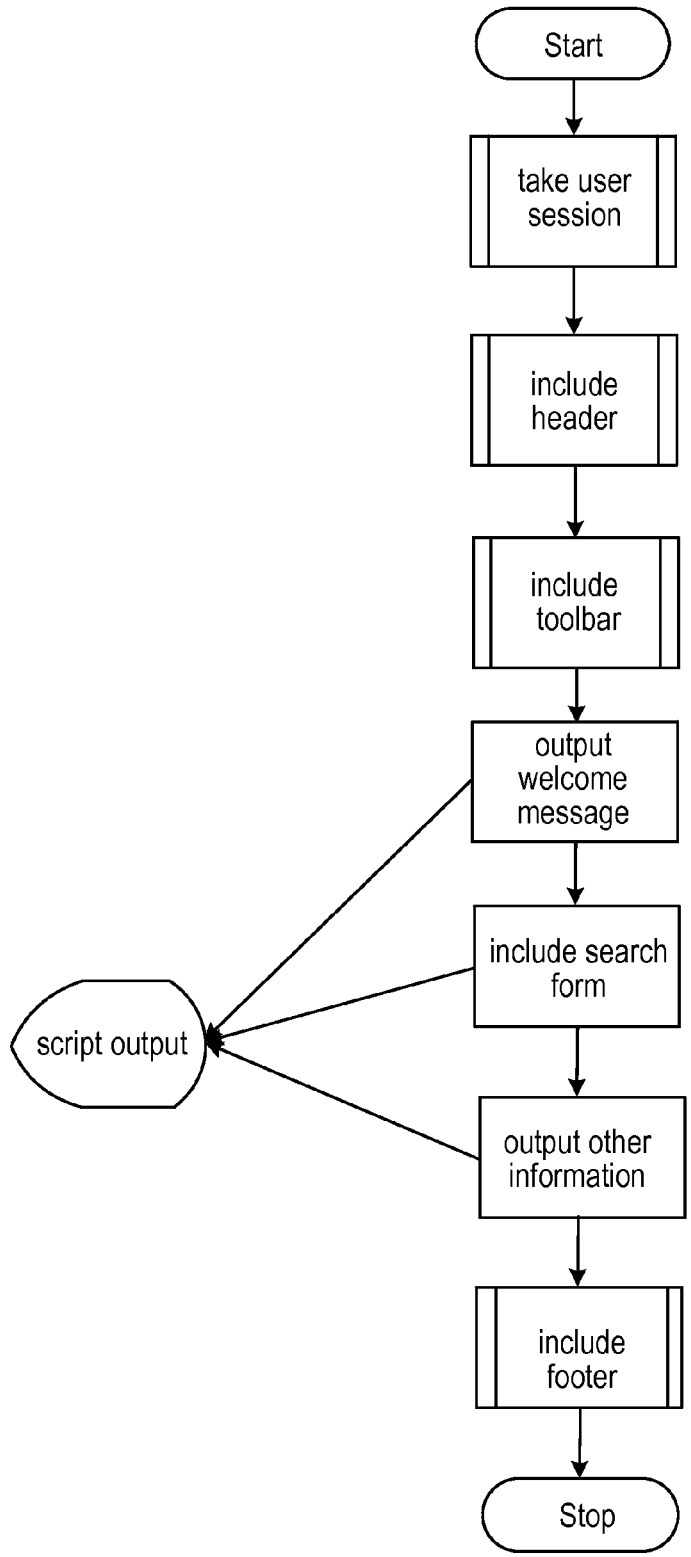
Figure 10:
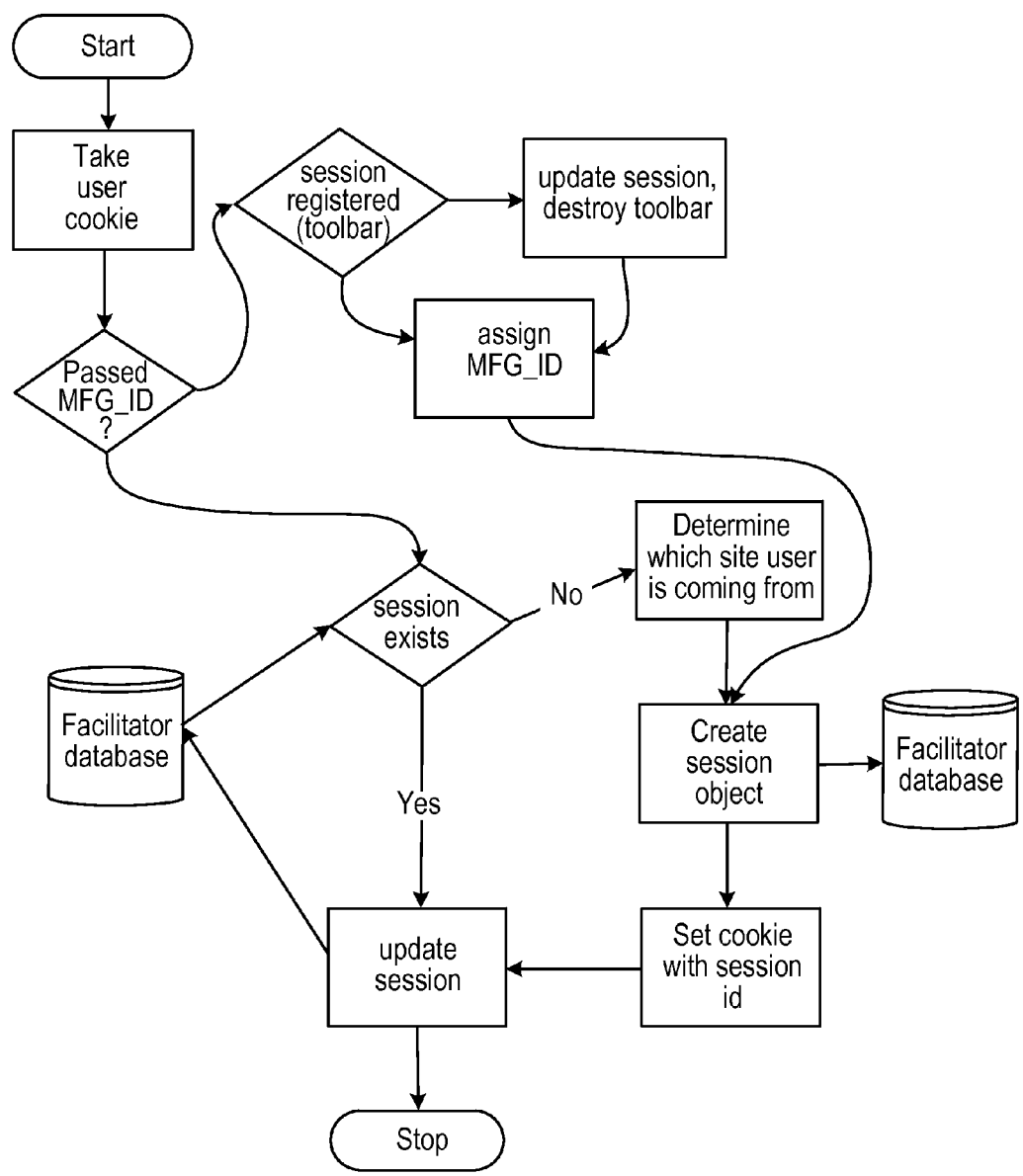
Figure 11:
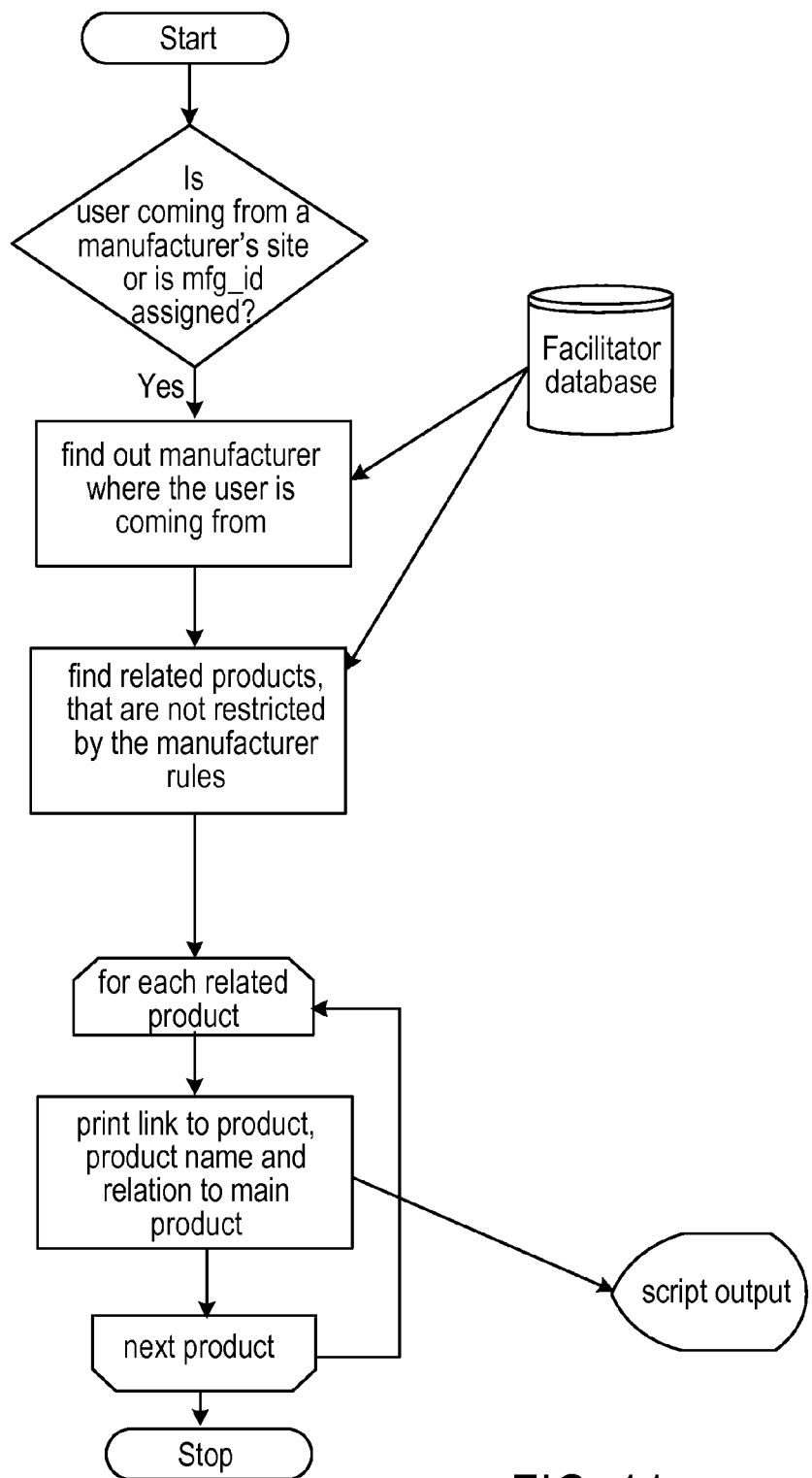
Figure 12:
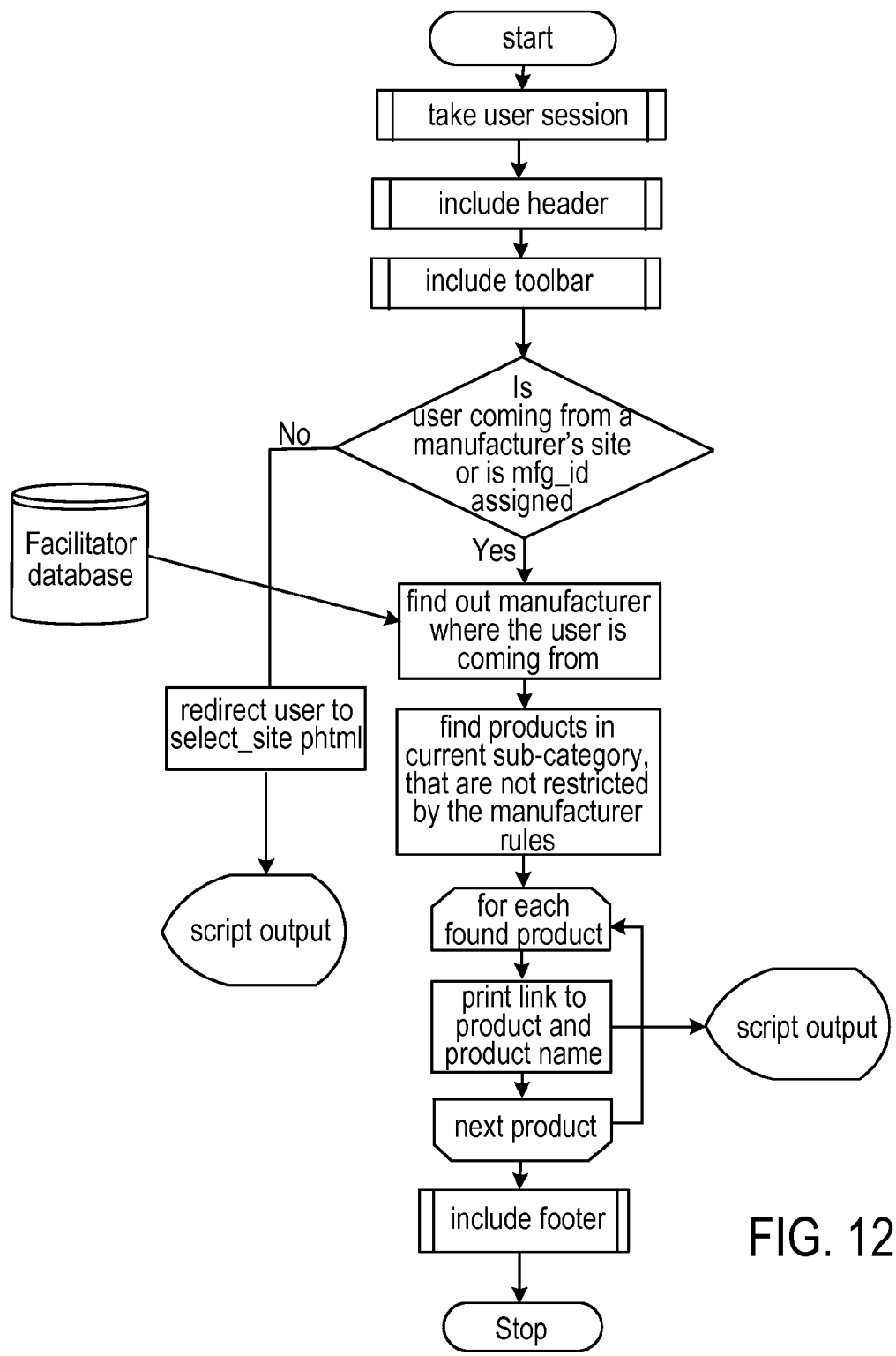
Figure 13:
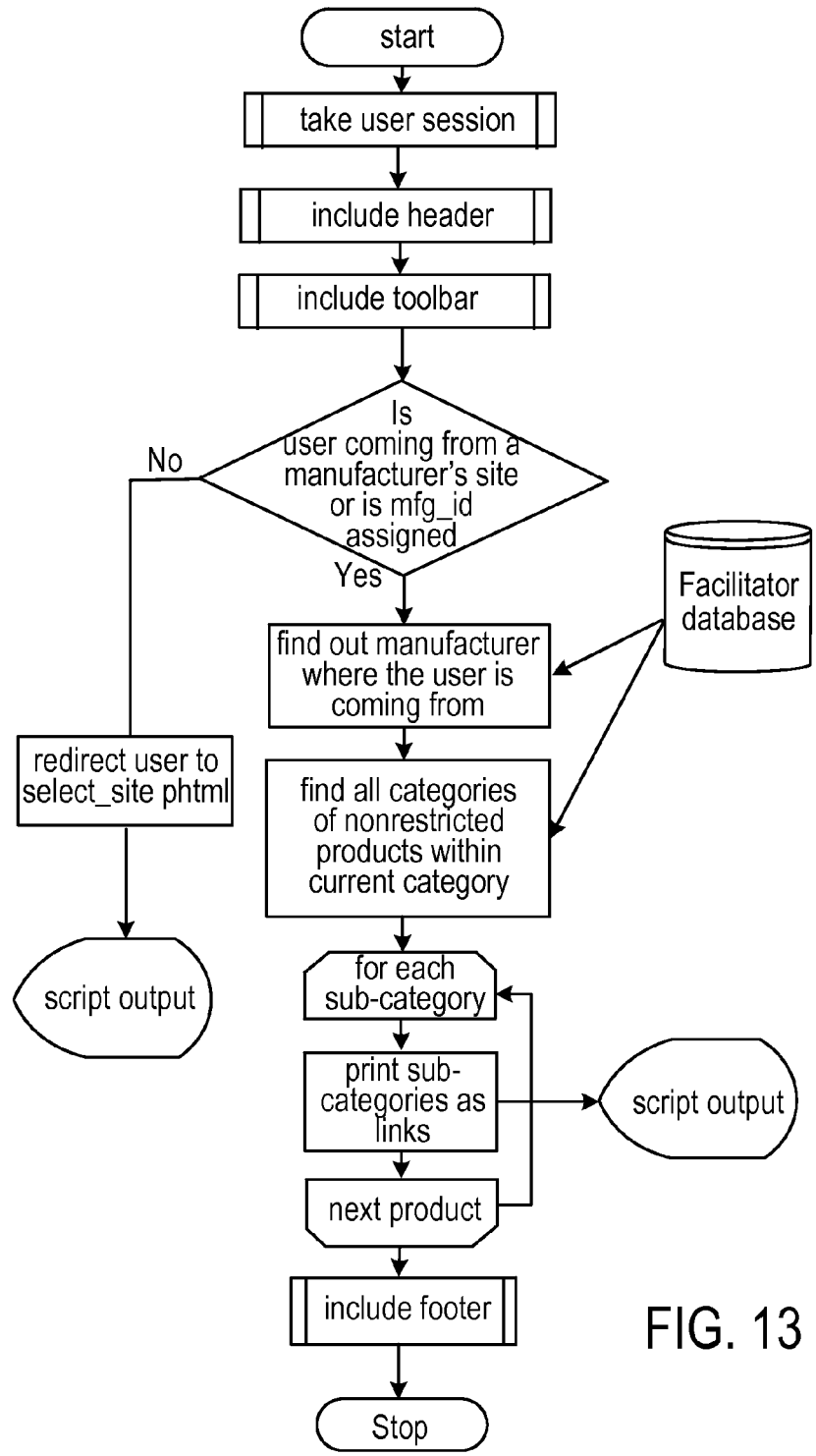
Figure 14:
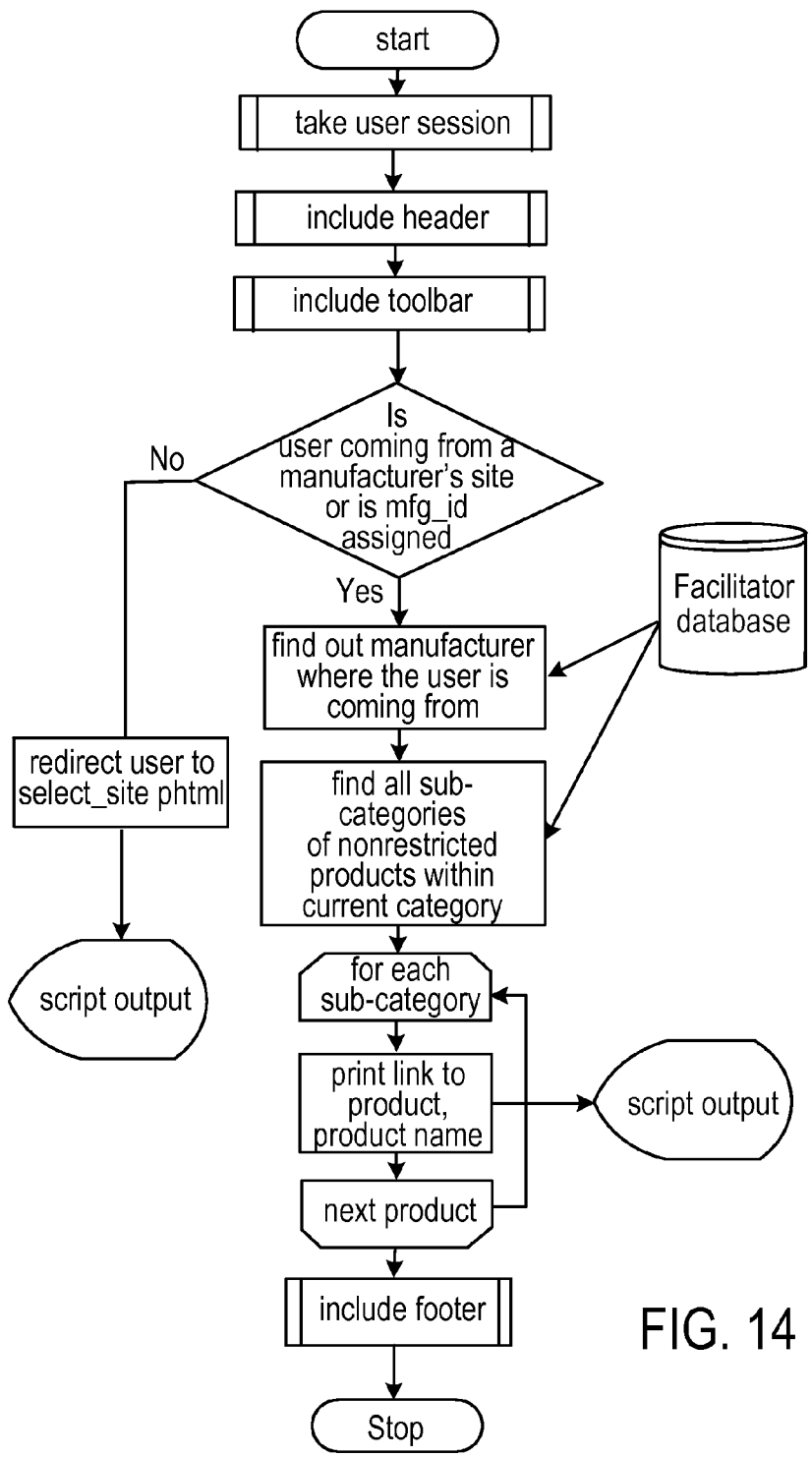
Figure 15:
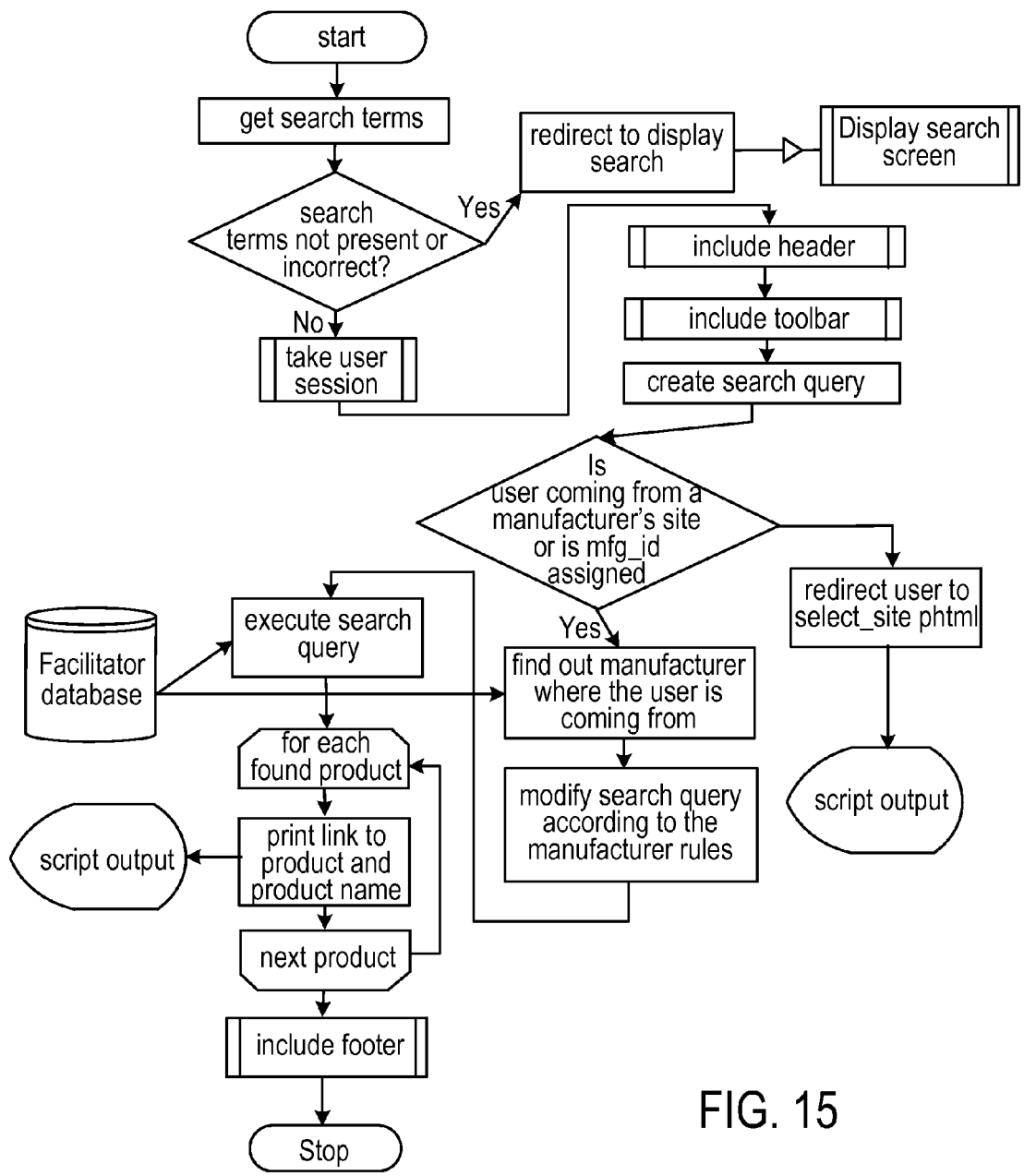
Figure 16:
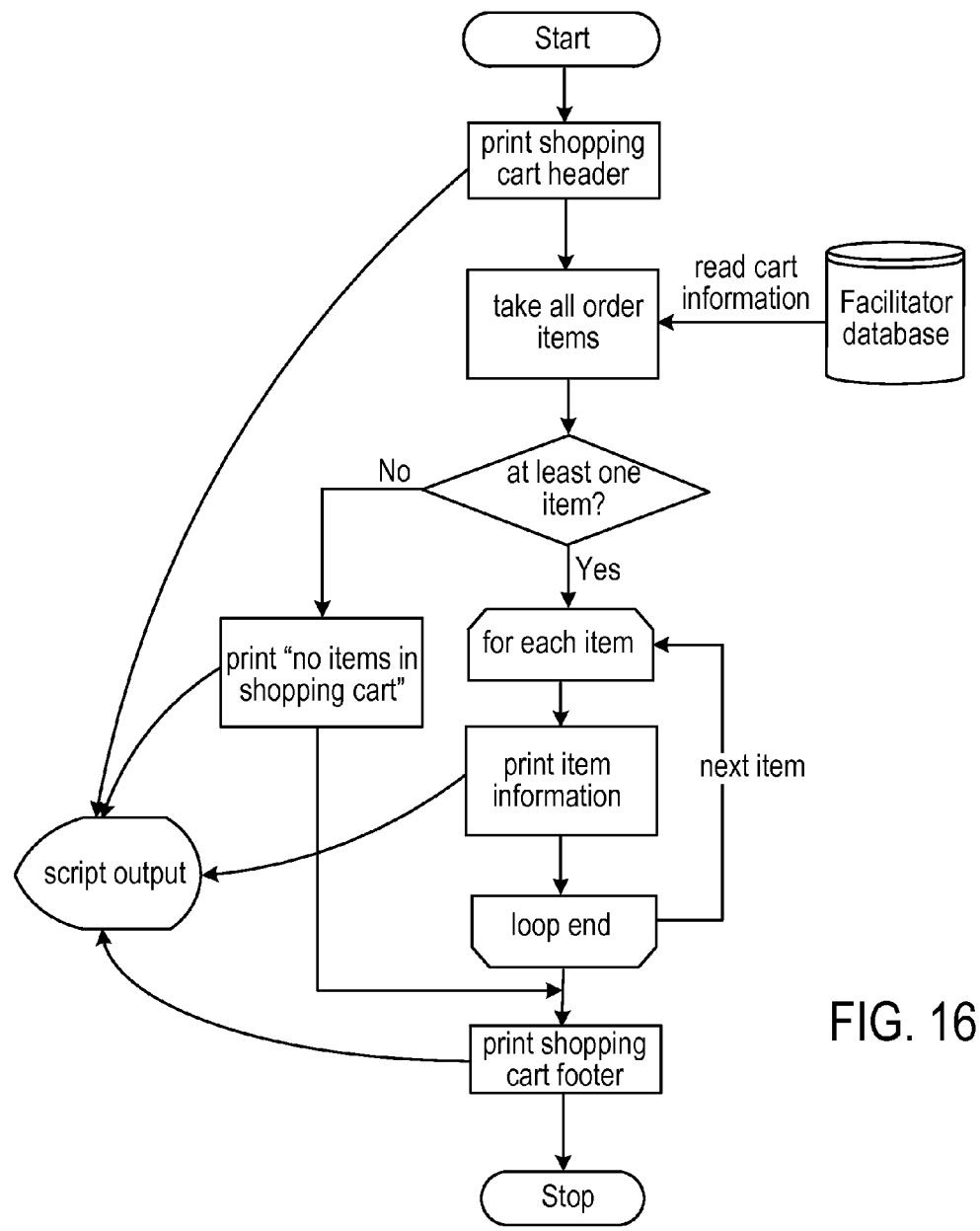
Figure 17:
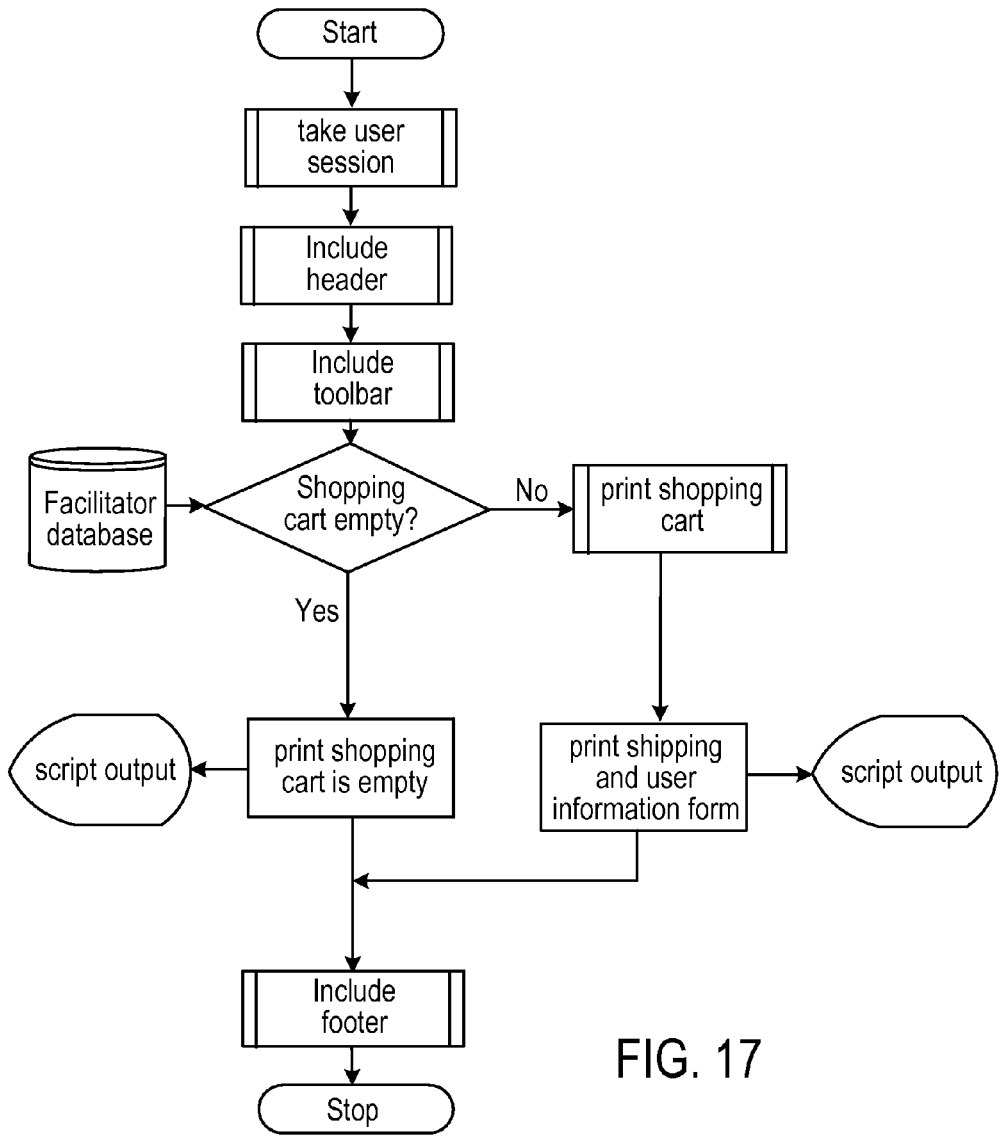
Figure 18:
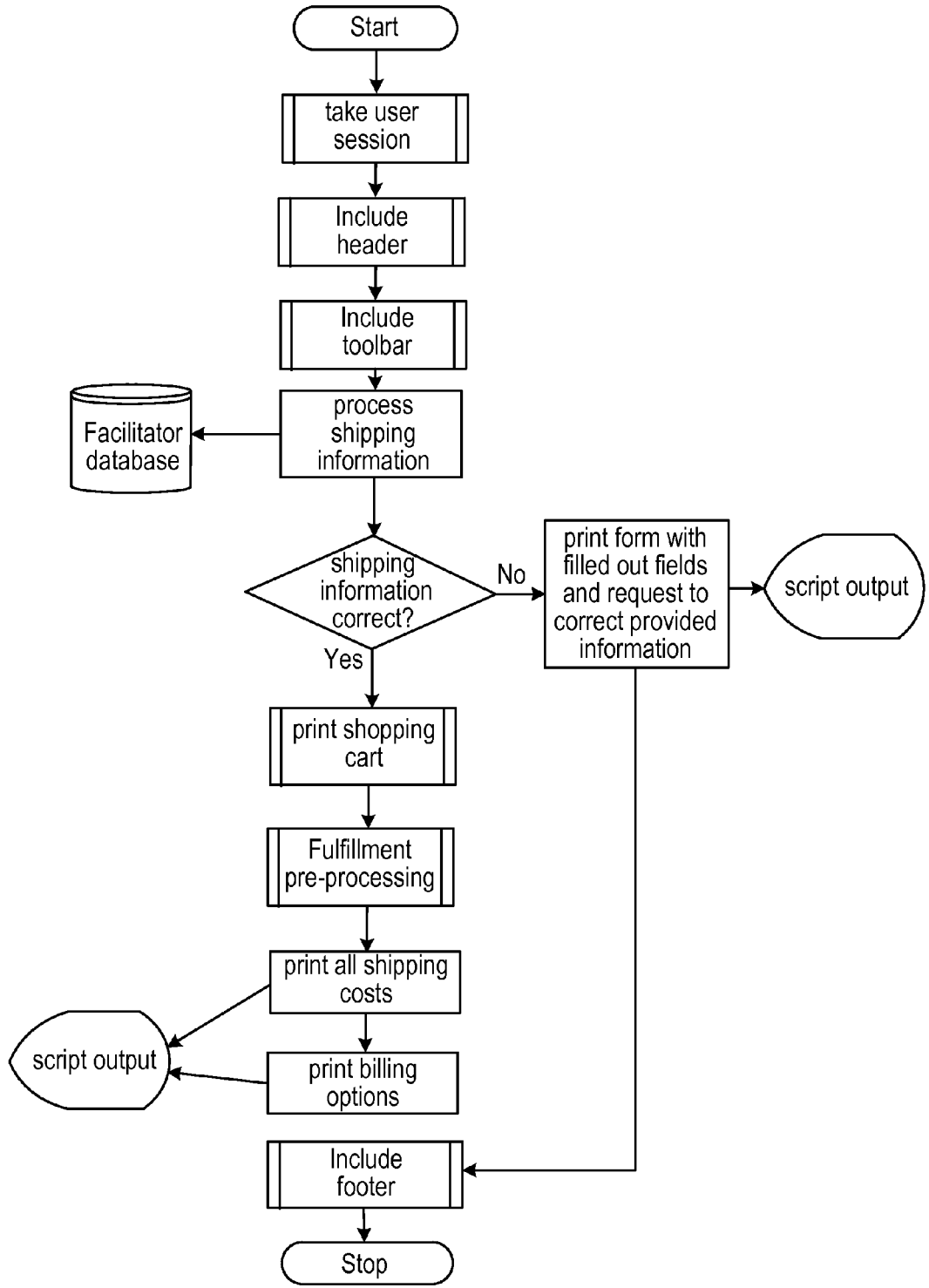
Figure 19:
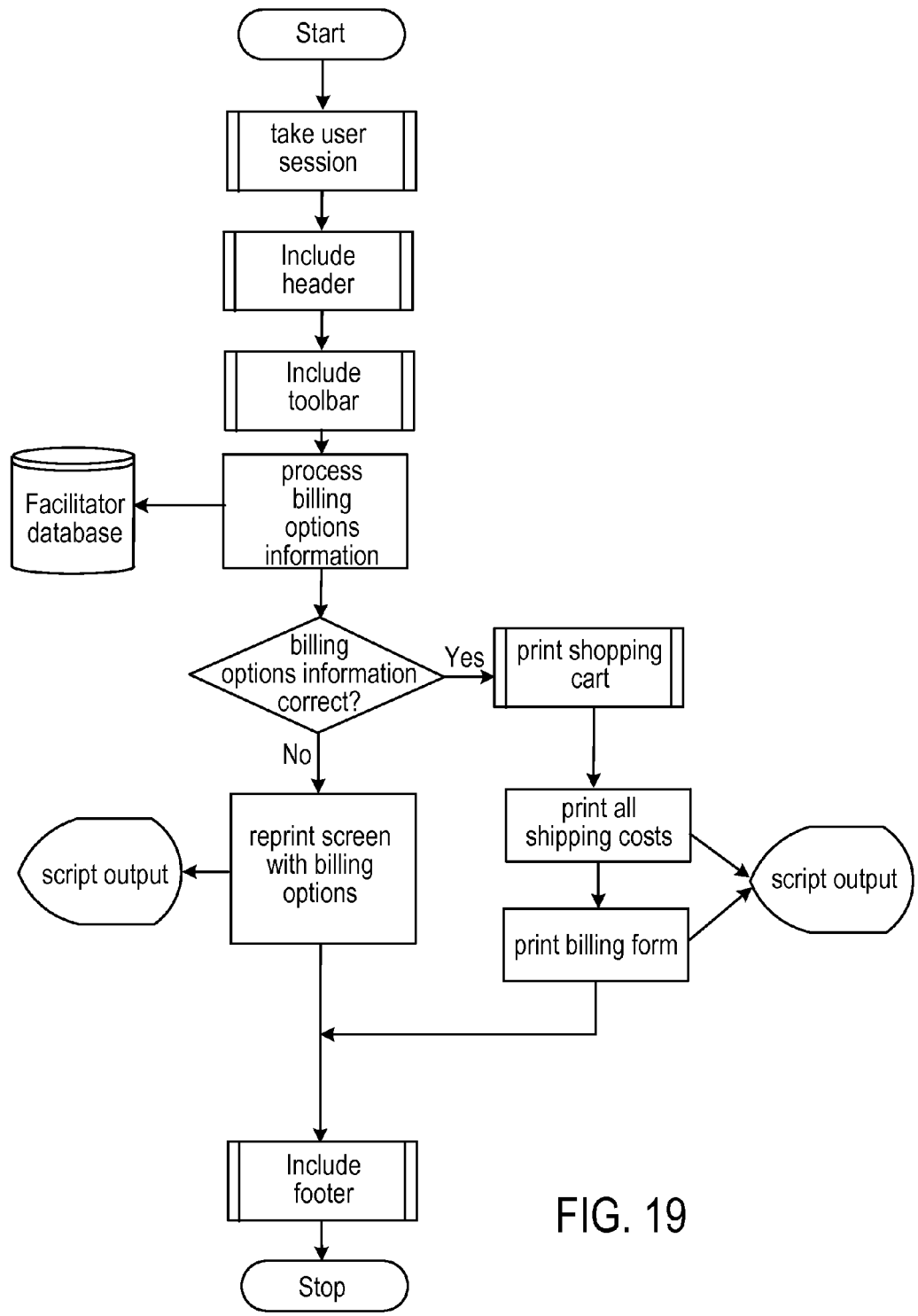
Figure 20:
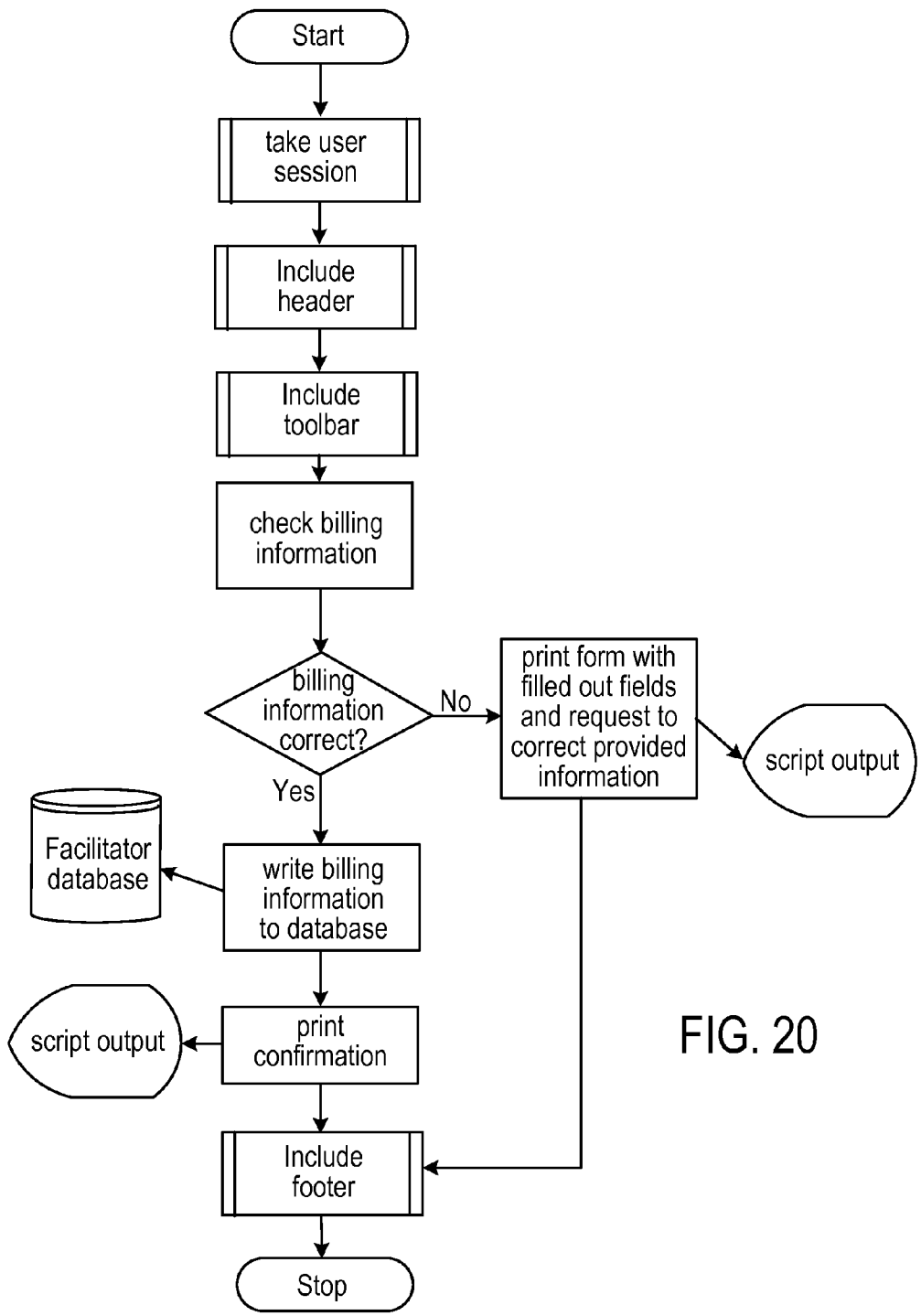

Referring now to FIG. 2, user 2006 desires to order a product from a manufacturer. User 2006 enters the world wide address of facilitator server machine 1002 into the address bar of the web browser running on user client machine 1006 to go to the intermediary web site 2102, or, alternatively, user 2006 is redirected to facilitator server machine 1002 by manufacturer server machine 1012, as explained above. Facilitator server machine 1002 responds to client machine 1006 with script language or meta language code representing a series of screens. FIG. 3 shows a high level diagram of the order in which the screens are generated. FIG. 4 shows an illustrative embodiment where user client machine 1006 is redirected to facilitator server machine 1002 via another server machine. FIGS. 5-20 illustrate data flow diagrams representing the inter-operation of client machine 1006 with facilitator server machine 1002, including entry, searching and catalog browsing, the shopping cart, and check out.

The product order may be placed on the manufacturer server machine 1012 via manufacturer web site 2103 and then sent to facilitator server 1002 electronically for distribution. In this case the client machine 1006 is not redirected to facilitator server 1002 until step 2104 of FIG. 2.

Figure 21A:
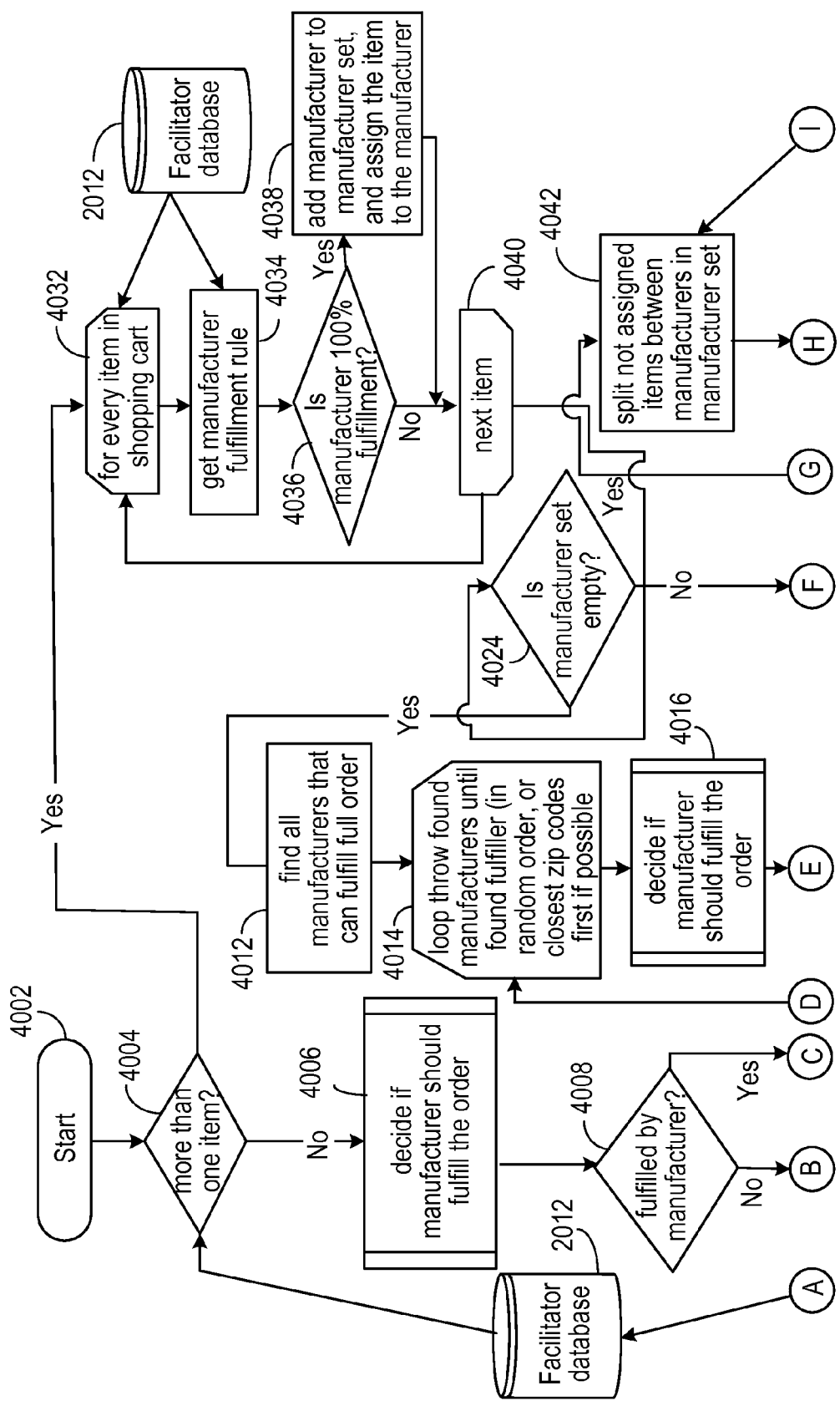
Figure 21B:
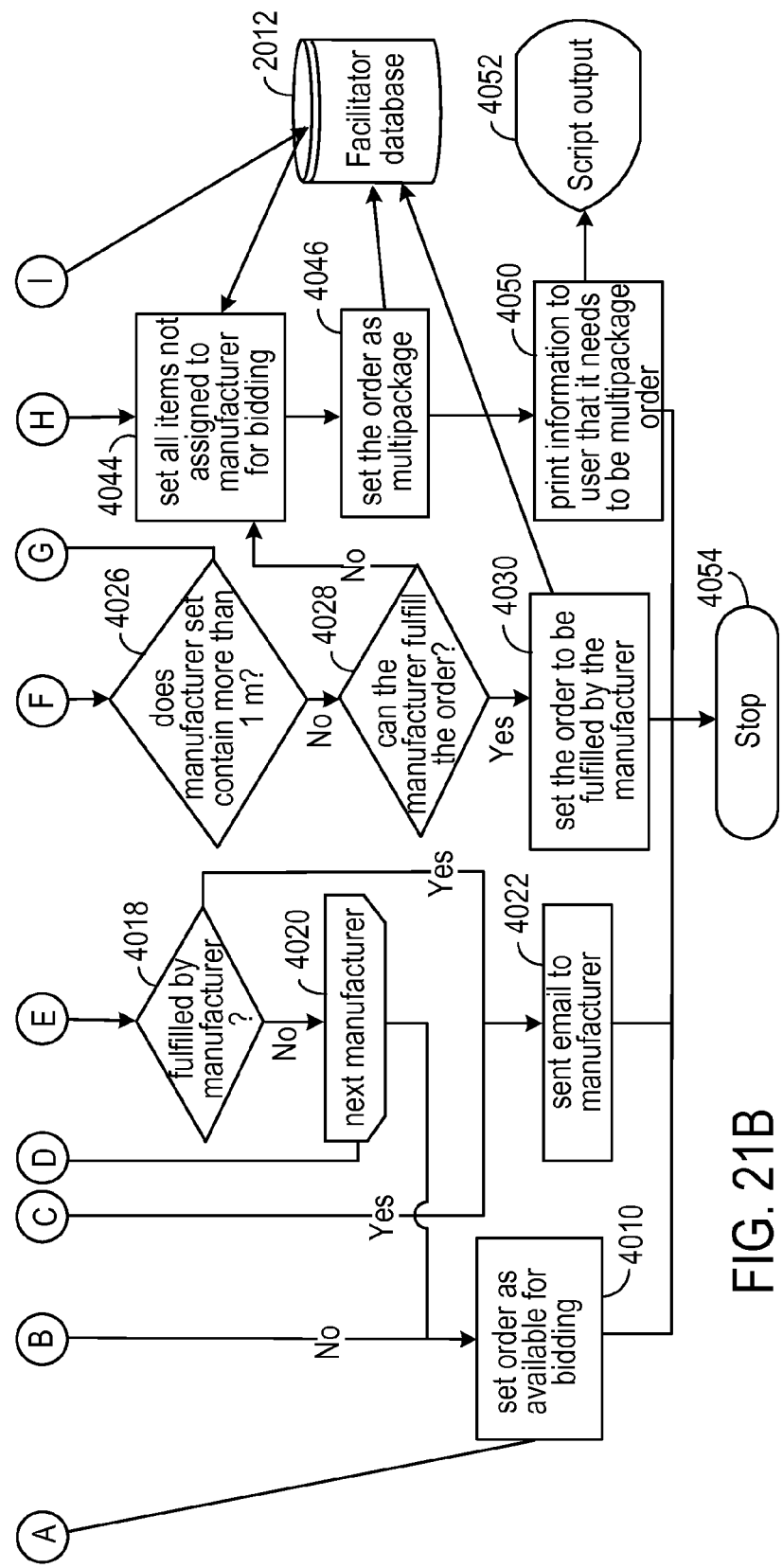
Figure 22:
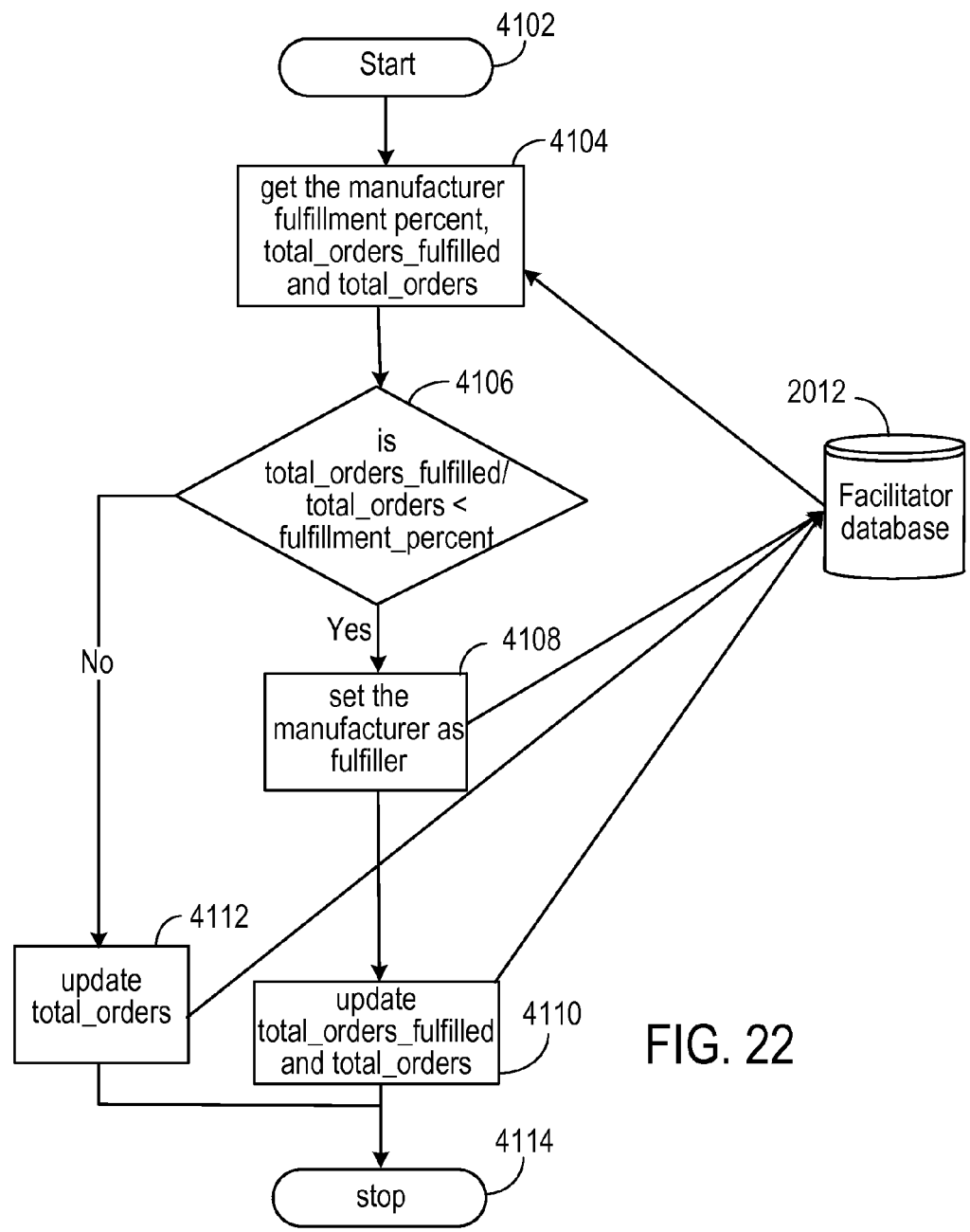

Returning to FIG. 2, once user 2006 has selected a product for purchase in accordance with the data flow diagrams contained in FIGS. 3-20, facilitator server machine 1002 progresses to step to 2104. At step 2104, facilitator server machine 1002 determines whether the order should be fulfilled by the manufacturer or by fulfiller 2008 or 2010 according to the data flow diagrams depicted in FIGS. 21 and 22. FIGS. 21 and 22 are explained in detail below. If the order is to be fulfilled by fulfiller 2008 or 2010, facilitator server machine 1002 progresses to step 2106. If, on the other hand, the order is to be fulfilled by the manufacturer, facilitator server 1002 proceeds to step 2116, where fulfiller 2008 becomes the manufacturer, and processing is continued as explained below.

The system is able to make predictive order assignment based on retailer order history and manufacturer preferences in the system. When orders are predictively assigned to a fulfiller in step 2105 to a fulfiller, the bidding procedures of step 2106 are bypassed and the fulfiller is notified of the assigned order in step 2113. The fulfiller has the option to accept or reject the predictively assigned order.

Figure 23:
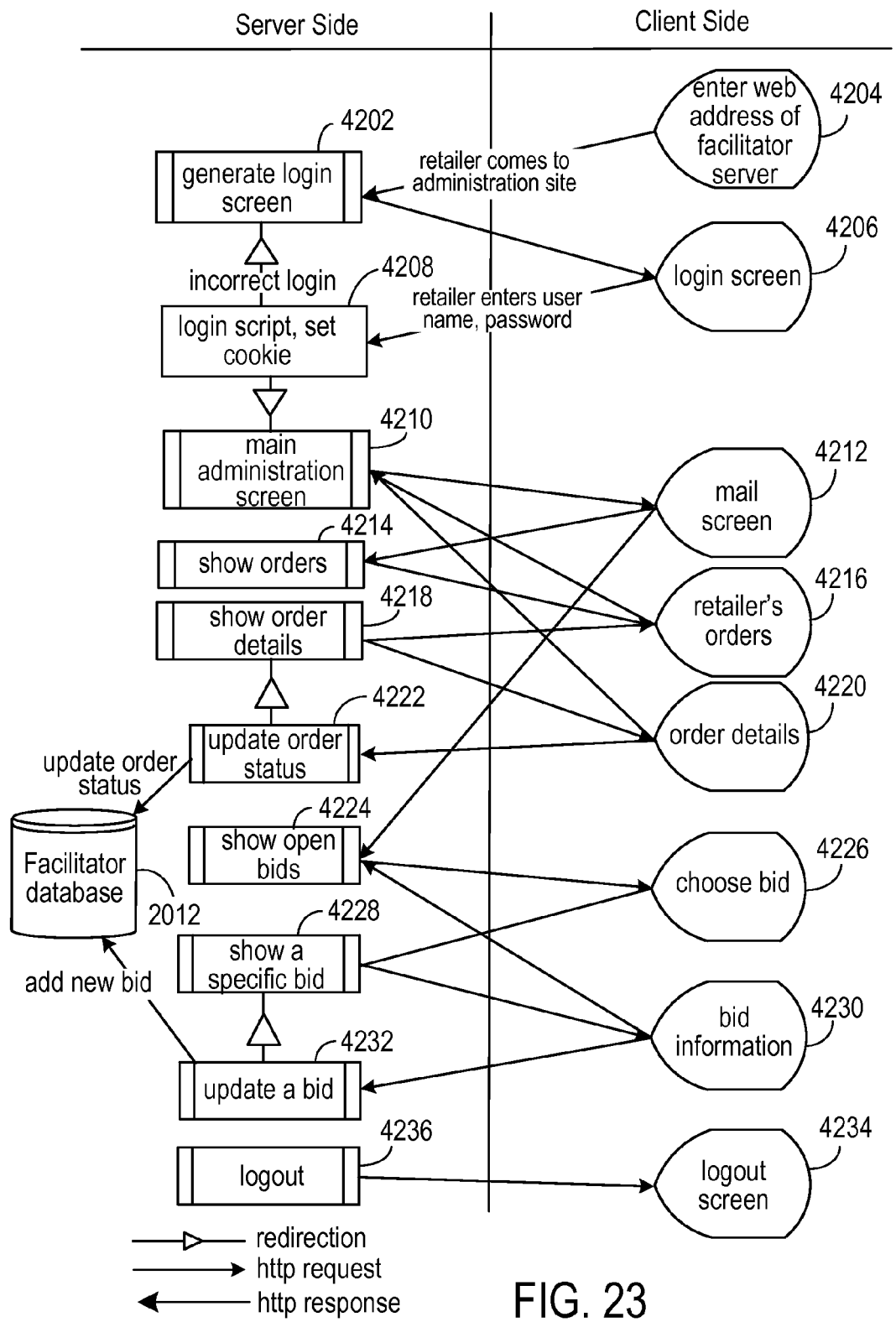

At step 2106, facilitator server 1002 processes bids for orders from fulfillers 2008 and 2010 according to the data flow diagram depicted in FIG. 23. FIG. 23 is described in detail below. If no bid is chosen, facilitator server machine 1002 returns to step 2106. However, once a bid is chosen, facilitator server machine 1002 progresses to step 2108. At step 2108, facilitator server machine 1002 determines which fulfiller 2008 or 2010 shall fulfill the order, according to the data flow diagrams depicted in FIGS. 24-27. If additional shipping charges are required, facilitator server 1002 progresses to step 2110. At step 2110, facilitator server 1002 sends an e-mail to user 2006 informing user 2006 of the additional charges. Upon receipt of the e-mail, user 2006 again accesses client machine 1006, which communicates with facilitator server machine 1002 at step 2112. User 2006 indicates to facilitator server machine 1002 at step 2112 whether user 2006 wishes to accept or decline the order in light of the additional charges. If user 2006 decides to cancel the order, facilitator server machine 1002 progresses to step 2114, the order is cancelled, and order processing ceases. However, if user 2006 decides to accept the order, facilitator server machine 1002 progresses to step 2116. If, at step 2108, a fulfiller 2008 or 2010 was chosen such that no additional shipping charges were required, facilitator server 1002 progresses to 2116.

At step 2116, facilitator server machine 1002 charges the cost of the product, and if applicable, shipping charges, to the credit card of user 2006, via a credit card processing network, as is well known in the art. After the credit card of user 2006 has been charged, facilitator server machine 1002 progresses to step 2118. At step 2118, facilitator server machine 1002 sends an e-mail to the particular fulfiller 2008 that was chosen at step 2108, notifying fulfiller 2008 to ship the ordered product or products to user 2006. Fulfiller 2008 accesses fulfiller client machine 1008, in order to update the order status. Client machine 1008 interacts with facilitator server machine 1002 at step 2120 indicating that the order has been fulfilled. Upon receiving notification that the order has been fulfilled, facilitator server machine 1002 provides a payment to fulfiller 2008 at step 2122, via any known method of debt fulfillment.

Turning to FIG. 21, a data diagram depicting the preprocessing fulfillment portion of step 2108 is shown. Facilitator database 2012 contains tables of information having records for such things as each item ordered by user 2006, the number of orders fulfilled by a particular manufacturer, whether an item is available for bidding and the like. At step 2108, facilitator server 1002 begins the fulfillment preprocessing at step 4002. Facilitator server 1002 progresses to decision step 4004. At step 4004, facilitator server 1002 determines whether user 2006 has ordered more than one item. If user 2006 has ordered more than one item, facilitator server 1002 progresses to step 4032. At step 4032, facilitator server 1002 begins processing a for/next loop for every item in the shopping cart of user 2006. Facilitator server 1002 determines the items contained in the order from database 2012. At step 4034, facilitator server 1002 retrieves the manufacturer fulfillment rule for each item from database 2012. At decision step 4036, facilitator server 1002 evaluates whether the manufacturer associated with current item fulfills 100% of the orders for that manufacturer. If the manufacturer is set for 100% fulfilling, facilitator server 1002 progresses to step 4038. At step 4038, facilitator server 1002 assigns fulfillment of the item to the manufacturer in database 2012. Facilitator server 1002 then progresses to step 4040. If on the other hand, the manufacturer associated with the current item is not set for 100% fulfilling, facilitator server 1002 progresses from decision step 4036 directly to step 4040. At step 4040, facilitator server 1002 determines whether every item in the shopping cart of user 2006 has been processed. If all items have not been processed, facilitator server 1002 returns to step 4032 and begins processing for the next item. However, if all items have been processed, facilitator server 1002 progresses from 4040 to decision step 4024.

At step 4024, facilitator server 1002 determines whether any item in the shopping cart of user 2006 is produced by a manufacturer that fulfills 100% of its orders, in other words, whether the manufacturer set is empty. If the manufacturer set is not empty, in other words, there is a manufacturer that fulfills 100% of its orders, then facilitator server 1002 progresses to decision step 4026. At step 4026, facilitator server 1002 determines whether there are more than one manufacturer of items in the shopping cart of user 2006, in which such manufactures fulfill 100% of their orders. In other words, at step 4026, facilitator server 1002 determines whether the manufacturer set contains more than one manufacturer. If so, facilitator server 1002 progresses from set 4026 to step 4042. At step 4042, facilitator server 1002 separates items assigned to a manufacturer according to manufacturer in database 2012. At step 4044, facilitator server 1002 sets all items not assigned to a manufacturer for bidding among fulfillers 2008 and 2010 in database 2012. At step 4046, facilitator server 1002 sets the order as a multi-packaged order in database 2012. At step 4050, facilitator server 1002 generates information to the user that the order must be a multi-package order. The information generated in step 4050 is output as a script 4052, where 4052 is transmitted from facilitator server 1002 to client machine 1006 via network 1004. After step 4050, facilitator server 1002 exits the fulfillment preprocessing subroutine at step 4054.

Returning to step 4026, if the manufacturer set contains only one manufacturer, then facilitator server 1002 progresses to decisional step 4028. At decisional 4028, facilitator server 1002 determines whether the manufacturer can fulfill the entire order. If the manufacturer can not fulfill the entire order, facilitator server 1002 progresses to step 4044, processing from step 4044 through step 4054 then continues as described above. However, if facilitator server 1002 determines at step 4028 that the manufacturer can fulfill the entire order the server progresses to step 4030. At step 4030, the server sets the order as one to be fulfilled by the manufacturer in database 2012. After step 4030, facilitator server 1002 exits the fulfillment preprocessing subroutine at step 4054.

Returning to step 4024, if the manufacturer set is empty, in other words, no manufacturer fulfills 100% of orders for its items, then facilitator server 1002 progresses to step 4012. At step 4012, facilitator server 1002 determines all manufactures that can fulfill the entire order. At step 4014, facilitator server 1002 enters a for/next loop for each of the manufacturers found that can fulfill the entire order. At step 4016, facilitator server 1002 determines whether the current manufacturer should fulfill the order according to the data diagram shown in FIG. 22, as described below. At decision step 4018, facilitator server 1002 determines whether the order is to be fulfilled by the current manufacturer. If so, facilitator server 1002 progresses to 4022. At step 4022, facilitator server 1002 sends an email message to the current manufacturer. After 4022, facilitator server 1002 exits the fulfillment preprocessing subroutine at step 4054. However, if at step 4018 facilitator server 1002 determines the order is not to be fulfilled by the current manufacturer, then facilitator server 1002 progresses to step 4020. At step 4020, facilitator server 1002 determines whether all of the found manufacturers have been processed, and if not, facilitator server 1002 returns to step 4014. On the other hand, if facilitator server 1002 determines at step 4020 that all manufacturers have been processed, then facilitator server 1002 proceeds to step 4010.

At step 4010, facilitator server 1002 sets the order as available for bidding in database 2012. After step 4010, facilitator server 1002 exits the fulfillment preprocessing subroutine at step 4054.

Returning to decision step 4004, if facilitator server 1002 determines that the shopping cart for user 2006 contains only one item, then facilitator server 1002 progresses to step 4006. At step 4006, facilitator server 1002 determines whether the order should be fulfilled by the manufacturer according to the data flow diagram shown in FIG. 22, as described below. At decision step 4008, facilitator server 1002 determines whether the order is to be fulfilled by the manufacturer. If so, then facilitator server 1002 progresses to step 4022 and processing continues through 4022 and 4054 as described above. If however, at step 4008, facilitator server 1002 determines the order is not to be fulfilled by the manufacturer, then facilitator server 1002 proceeds to step 4010 and processing continues as described above through 4010 and 4054.

Referring now to FIG. 22, a data diagram is shown depicting a subroutine to determine whether a manufacturer should fulfill an order. Facilitator server 1002 enters the subroutine at step 4102. At step 4104, facilitator server 1002 extracts variables representing the desired fulfillment percentage for the current manufacturer, the total number of orders fulfilled by the current manufacturer, and the total number of orders for items from the current manufacturer from database 2012. At decision step 4106, facilitator server 1002 determines whether the total number of orders fulfilled by the manufacturer divided by the total number of orders for the manufacturer is less than the desired fulfillment percentage for the manufacturer. If so, then facilitator server 1002 proceeds to step 4108. At step 4108, facilitator server 1002 sets the manufacturer as the fulfiller of the current order in database 2012. At step 4110, facilitator server 1002 updates the variables representing the total orders fulfilled by the current manufacturer, and the total order for the current manufacturer in database 2012. For example, each of these variables is incremented by one in database 2012. Returning to step 4106, if the percentage of total orders fulfilled for the current manufacturer is greater than the desired fulfillment percentage for the current manufacturer, then facilitator server 1002 proceeds to step 4112. At step 4112, facilitator server 1002 updates the total orders variable for the current manufacturer in database 2012. For example, the total orders variable is incremented by one. Following step 4110 and/or 4112, facilitator server 1002 exits the subroutine at step 4114.

Turning to FIG. 23, the bidding procedure of step 2106 is shown in greater detail. As described above, fulfiller 2008 enters the world wide web address of facilitator server 1002 into the web browser of fulfiller client machine 1008, at step 4204. Facilitator server machine 1002 responds at step 4202 by generating a log-in screen 4206, which is displayed on machine 1008. Fulfiller 2008 enters his user name and password into the log-in screen, and this user name and password are transmitted to facilitator server machine 1002 at step 4208. At step 4208, facilitator server machine 1002 sets a cookie on client machine 1008, as is known in the art. Furthermore, at step 4208, facilitator server machine 1002 determines whether or not the user name and password are valid. If the user name and password are not valid, facilitator server 1002 returns to step 4202 in order to allow fulfiller 2008 to try logging in again. However, if the user name and password are correct, then facilitator server machine 1002 proceeds to step 4210. At step 4210, facilitator server machine 1002 generates the main administration screen 4212, which is displayed on client machine 1008. Although not shown FIG. 23, all screens except log in screen 4206 include an option for fulfiller 2008 to log out of the system. If fulfiller 2008 chooses the log out option on any screen, facilitator server machine 1002 proceeds to step 4236, and generates log out screen 4234, which ends the current session of fulfiller 2008.

Main screen 4212 provides fulfiller 2008 with an option to view his current orders, and with an option to view open bids. If fulfiller 2008 chooses the option to show his current orders, facilitator server machine 1002 proceeds to step 4214. At step 4214, facilitator server 1002 generates an orders screen 4216, which is displayed on client machine 1008. Orders screen 4216 provides fulfiller 2008 with an option to return to the main administration screen, and with an option to show the details of a selected order. If fulfiller 2008 chooses the option to show the details of an order, facilitator server 1002 proceeds to step 4218. At step 4218, facilitator server 1002 generates order details screen 4220, which is displayed on client 1008. Order detail 4220 provides fulfiller 2008 with the option to update order status or to return to the main administration screen. If fulfiller 2008 chooses the option to update the order status, facilitator server 1002 proceeds to step 4222. At step 4222, facilitator server 1002 accesses database 2012 in order to update the status of the orders for fulfiller 2008. Facilitator server 1002 then proceeds to step 4218, which is described above. If fulfiller 2008 selects the option to return to the main administration screen 4210 from order details screen 4220, facilitator server 1002 proceeds to step 4210 and continues as described above.

If fulfiller 2008 selects the option to show open bids from screen 4212, facilitator server 1002 proceeds to step 4224. At step 4224, facilitator server 1002 generates choose bid screen 4226, which is displayed on client 1008. Fulfiller 2008 selects a specific bid from those included in 4226. This selection causes facilitator server 1002 to proceed to step 4228. At step 4228, facilitator server 1002 generates bid information screen 4230, which is displayed on client machine 1008. If fulfiller 2008 chooses to place a bid, facilitator server 1002 proceeds to step 4232. At step 4232, facilitator server 1002 updates the bid information in data base 2012. Facilitator server 1002 then proceeds to step 4228, which performs as described above. Note that the term "bid", as used herein, is not a matter of price, such as one would expect in an auction, but rather, herein the term "bid" merely indicates that fulfiller 2008 is willing to fulfill an order for an item. The cost for the item that user 2006 will pay was already assigned prior to check out step 2104 shown in FIG. 2, as described above.

After fulfiller 2008 has finished a bidding session, he selects the log out option from any of the screens described above, which causes facilitator server machine 1002 to proceed to step 4236. At step 4236, facilitator server 1002 generates log out screen 4234, which is displayed on client 1008, and the current session ends.

Alternatively the fulfiller 2008 can see orders for bidding and place bids on order through the server software application for the server network. A software application may be run on fulfiller client machine 1008 to allow a fulfiller to accomplish all tasks set forth in FIGS. 5-20 similar to using the web pages.

Figure 24A:
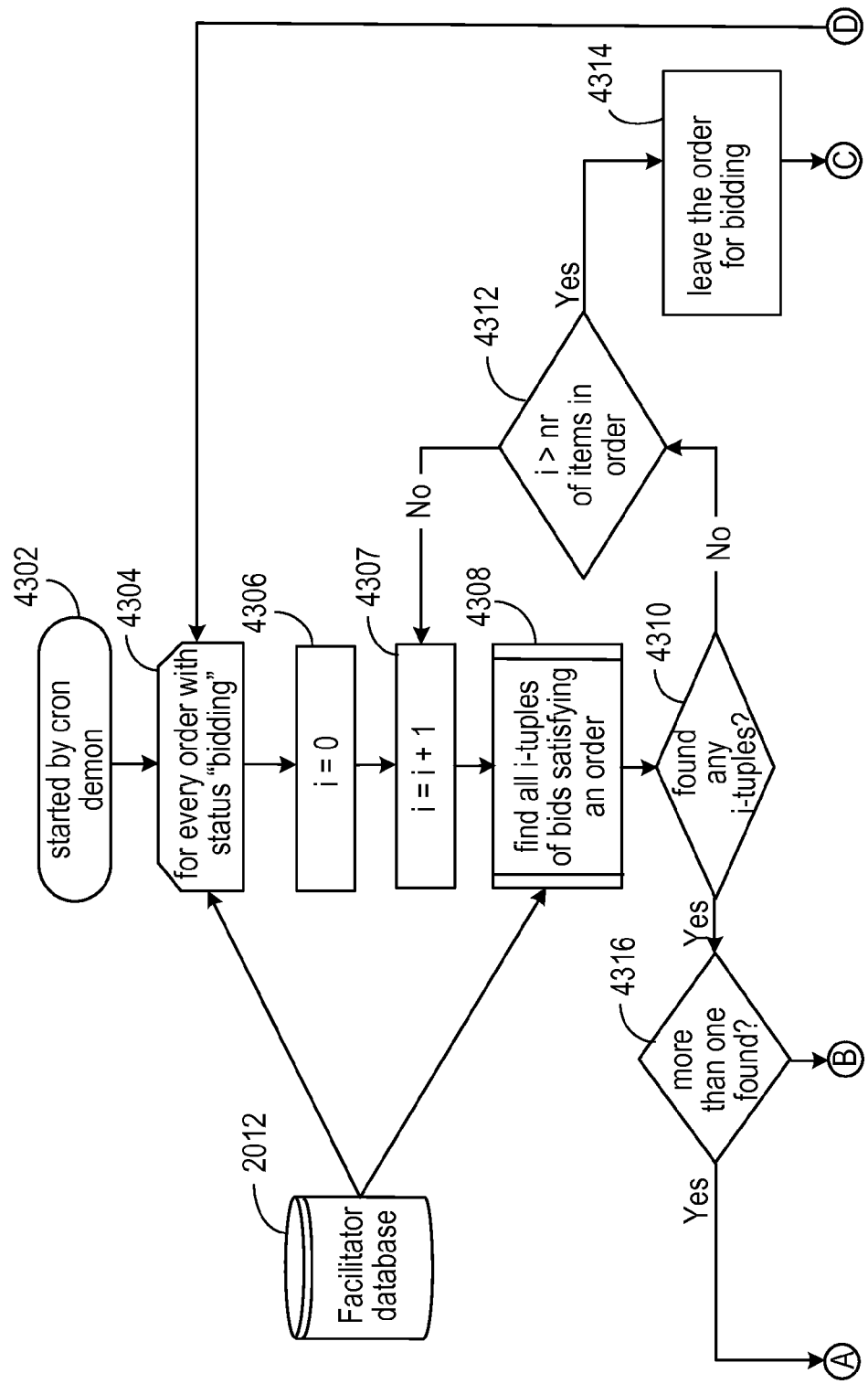
Figure 24B:
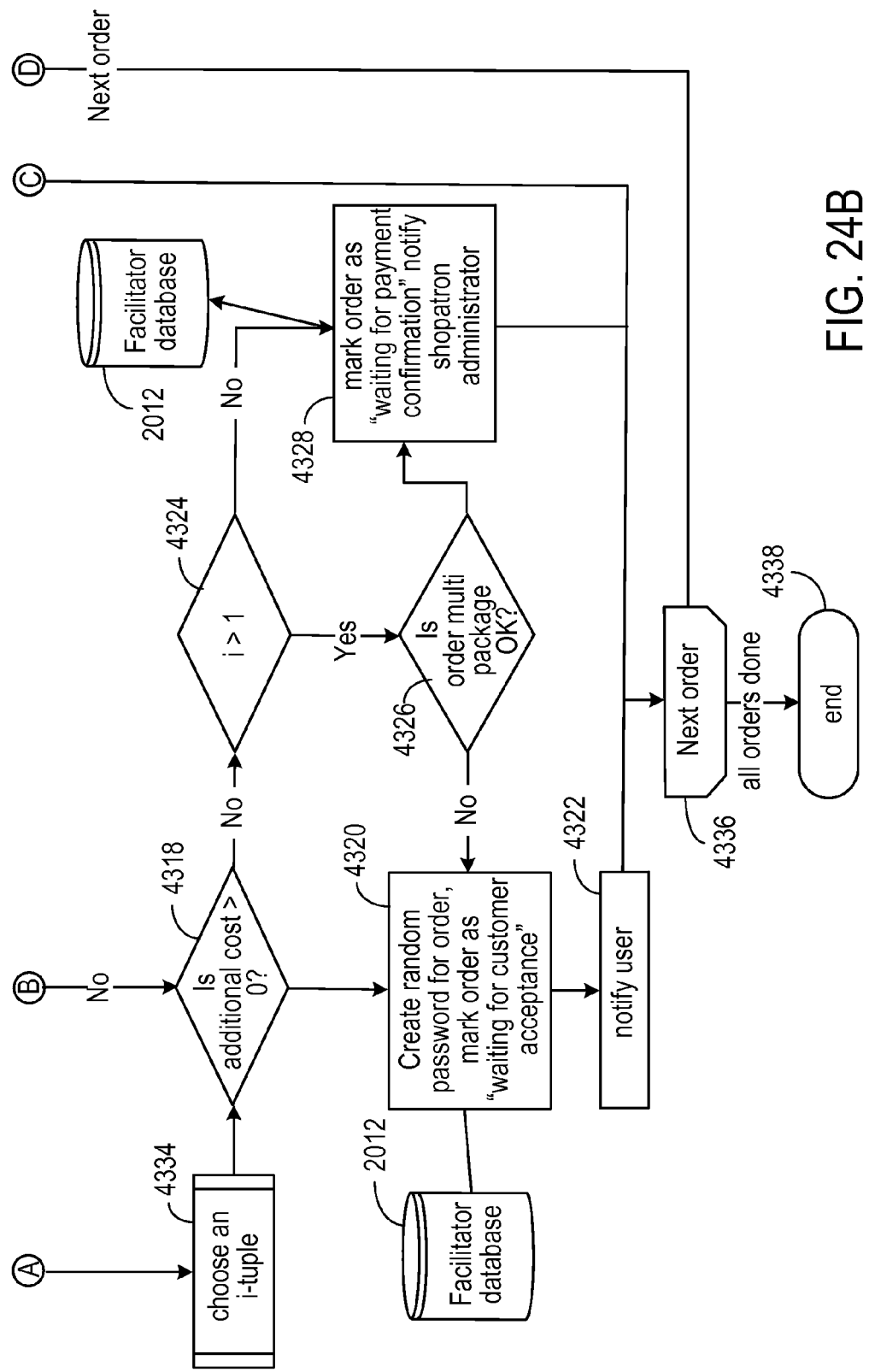
Figure 25:
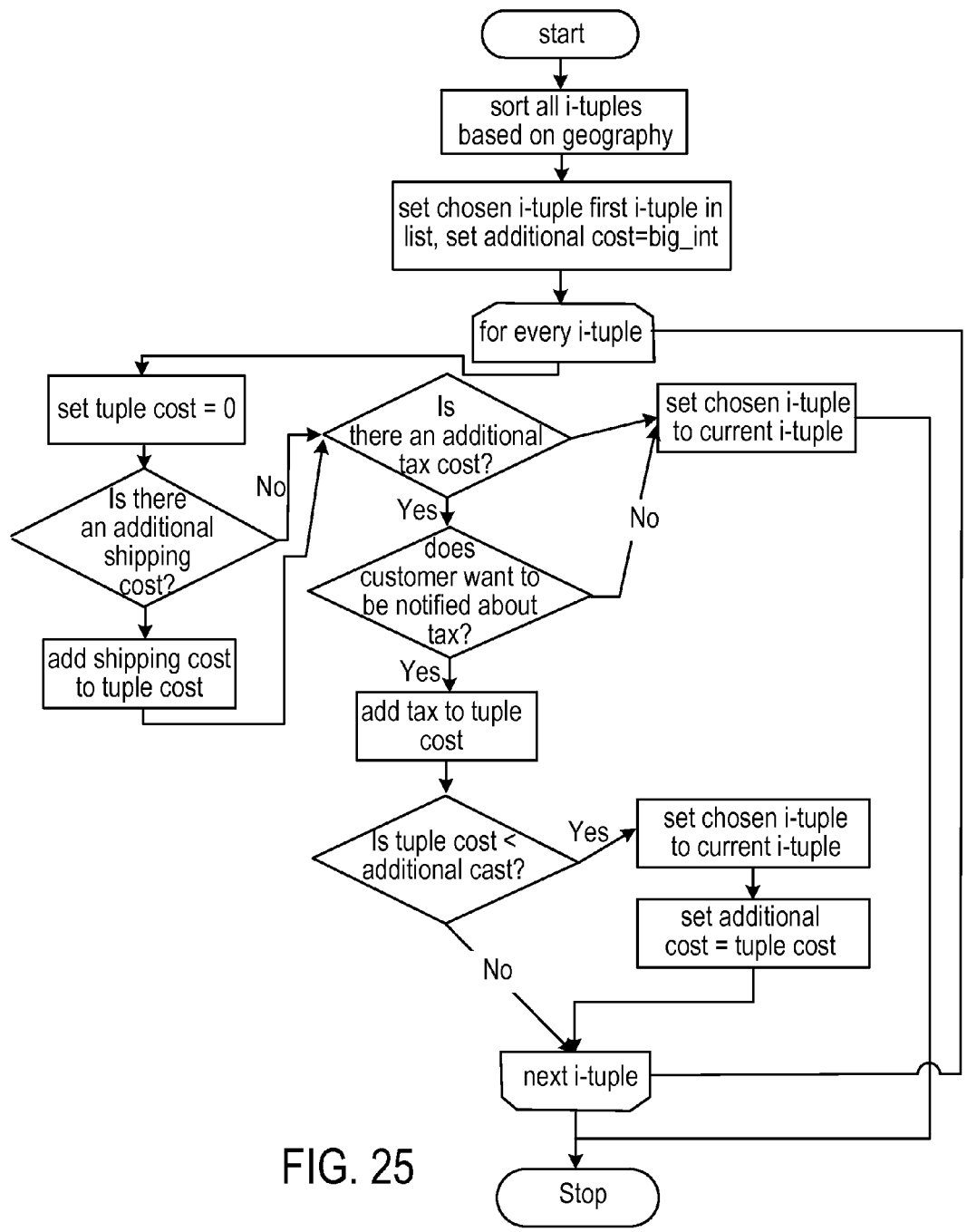

Turning now to FIG. 24, the subroutine for resolving bids, in other words, the subroutine for deciding which fulfiller shall fulfill an order, is shown. At step 4302, facilitator server machine 1002 initiates the subroutine, for example, by use of the cron demon. The cron demon is set up to run the subroutine at a particular time everyday, when it is expected that bids will have been placed for all orders, for example, 3:00 A.M. At step 4304, facilitator server 1002 begins a for/next loop for every order which has a status equal to "bidding". At step 4306 facilitator server machine 1002 initializes and variable "i" to equal "zero" where "i" represents the number of the current item in the current order. At step 4307, variable "i" is incremented by one.

Figure 26:
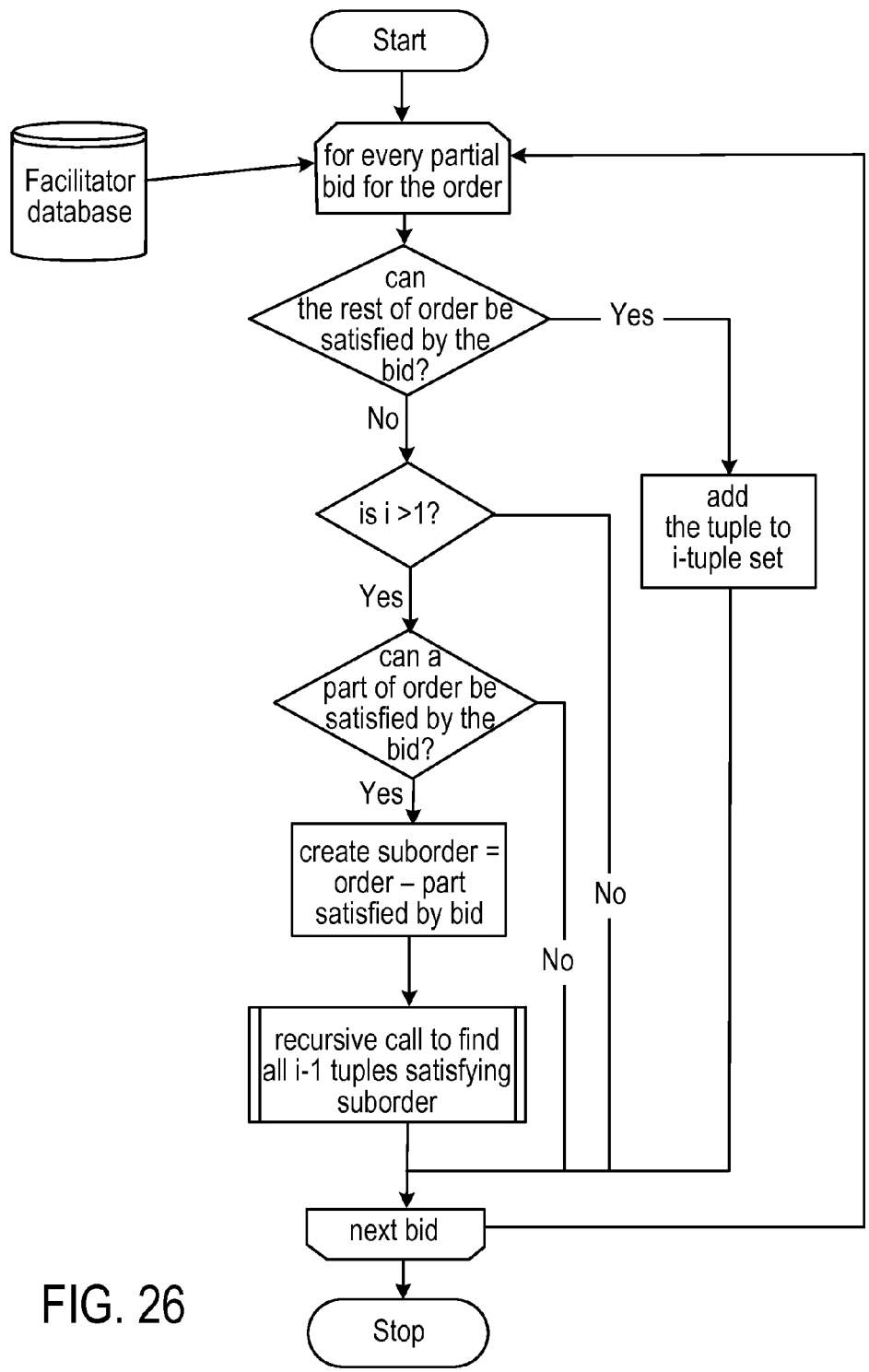
Figure 27:
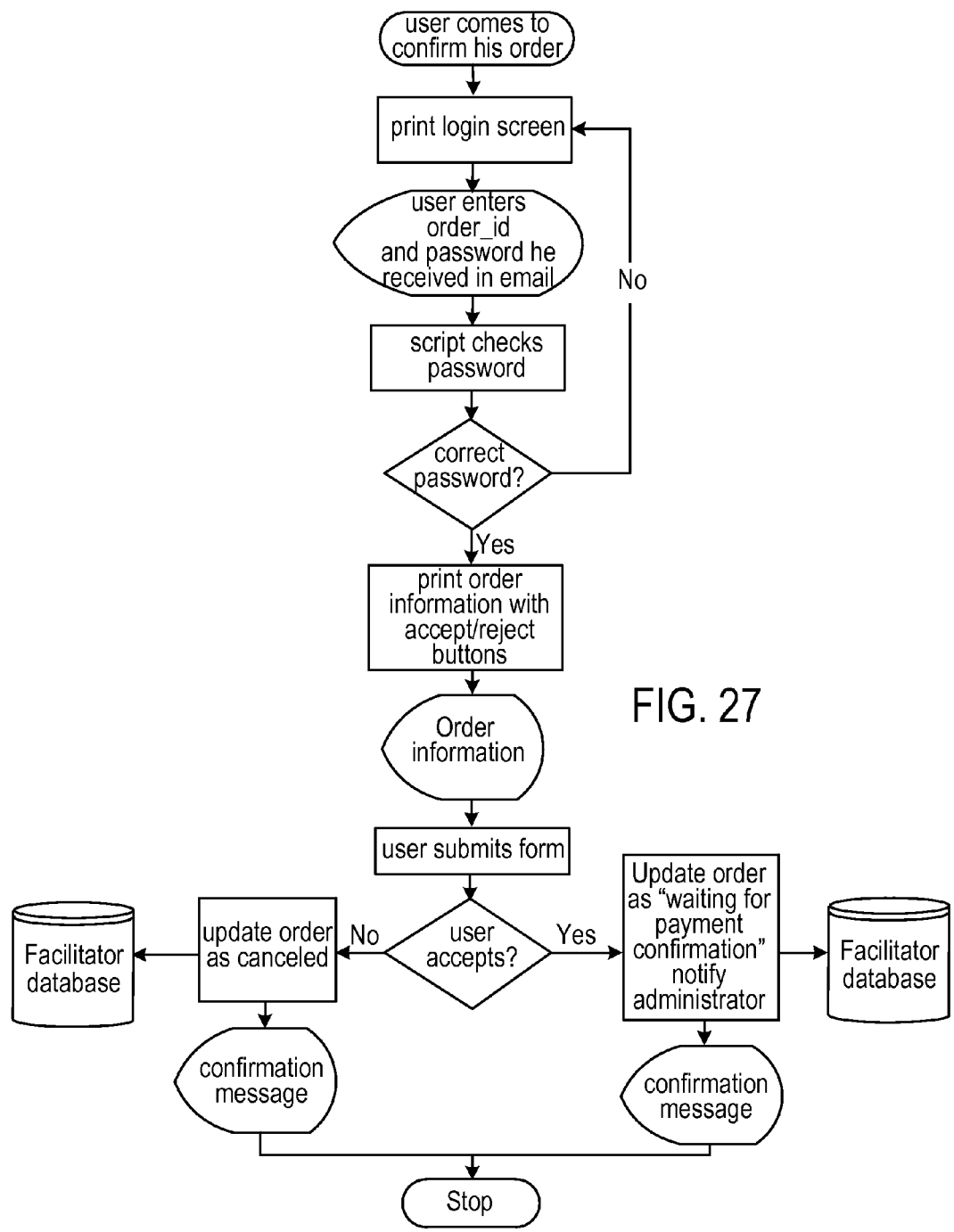

At step 4308, facilitator server 1002 finds all i-tuples of bids satisfying an order, as shown in detail in FIG. 26. An i-tuple is a list of fulfillers having "i" elements, where each element has a reference to order items that each retailer wishes to fulfill. That decisional step 4310, facilitator server 1002 determines whether any i-tuples have been found. If no i-tuples have been found, facilitator server 1002 proceeds to decision step 4312. At step 4312, facilitator server 1002 determines whether the variable "i" is greater than or equal to the total number of items in the order. If "i" is less than the total items in the order, facilitator server 1002 returns to step 4307, and proceeds as described above. If "i" is not less than the total number of items in the order, facilitator server 1002 proceeds to step 4314. At step 4314, facilitator server 1002 leaves the current order open for bidding and proceeds to step 4336. At step 4336, facilitator server 1002 determines whether the current order is the last order with a billing status equal to "bidding". If so, then all orders have been completed, and facilitator server 1002 exits this subroutine at step 4338. However, if all orders have not been processed, facilitator server 1002 returns to step 4304, and progresses as described above. Returning to step 4310, if one or more i-tuples were found, then facilitator server 1002 proceeds to decisional step 4316. At step 4316, facilitator server 1002 determines whether more than one i-tuple was found. If more than one is found, facilitator server 1002 proceeds to step 4334. At step 4334, facilitator server 1002 chooses the i-tuples with the minimal distance, shipping cost, and tax cost.

However, if there is only one i-tuple, facilitator server 1002 proceeds to step 4318. Also, if at step 4316 facilitator server 1002 determined that only one i-tuple was found, facilitator server 1002 proceeds to step 4318.

At step 4318, facilitator server 1002 determines whether there are shipping costs which were not communicated to user 2006 when user 2006 checked out step 2104. If there are no additional shipping costs, then at step 4324 facilitator server 1002 determines whether there is more than one retailer fulfilling the this order (the number of packages in the order "i"). If there is only one package i=1, facilitator server 1002 proceeds to step 4328. At step 4328, facilitator server 1002 marks the current order as waiting for payment confirmation, notifies the system administrator, and updates database 2012. Facilitator server 1002 then proceed to step 4336. Processing continues at step 4336 as described above. If at step 4324 facilitator server 1002 determines that variable "i" is greater than one, then facilitator server 1002 proceeds to step 4326. At step 4326, facilitator server 1002 determines whether the current order is approved for multi-package delivery. If so, then facilitator server 1002 proceeds to step 4328, and processing continues as described above. If not, then facilitator server 1002 proceeds to step 4320. Also, if in step 4318 facilitator server 1002 determined that additional shipping costs were greater than zero, facilitator server 1002 proceeds to step 4320.

At step 4320, facilitator server 1002 generates a random password for the current order, and marks the order as "waiting for customer acceptance". Furthermore, at step 4320, the random password and the fact that the order is waiting for acceptance are indicated in database 2012. At step 4322, facilitator server 1002 communicates with user client 1006 to notify user 2006 of the random password and the fact that the order must be accepted before being shipped. After step 4322, facilitator server 1002 proceeds to step 4336 and processing continues as described above. When user 2006 is notified at step 4322, user 2006 accepts or declines the order according to the flow chart shown in FIG. 27.

A manufacturer may elect to distribute income to fulfillers that were unsuccessful in the bidding process. In such a case, the facilitator server machine 1002 may be programmed based on criteria established by the manufacturer to give some of the income received from a product sale to fulfillers that bid on the product order but did not actually fulfill any of the product order. This is to reward those fulfillers, for example, that have in stock products similar to, but not the same as, the ordered product. The intermediary machine 1002 may be programmed to provide such income distribution for only certain or all products in a manufacturer product line and may be programmed to set an income distribution percentage for each product in the manufacturer product line.

The systems and methods disclosed herein provide an online facilitated shopping service which may be useful for small- and medium-sized businesses or other-sized businesses. The shopping service may be useful in the hobby industry, for example. Use of the shopping service is now explained in more detail by an exemplary scenario relating to a hobbyist wishing to purchase a product from a manufacturer over the Internet.

There are different ways that a hobbyist may place a product order for a product of a manufacturer. First, the manufacturer may offer the hobbyist an option to place an order for the product on a manufacturer server machine of the manufacturer. If the manufacturer offers this option, the hobbyist may go to the web site of the manufacturer and place the product order. The product order is then sent, unbeknownst to the hobbyist, from the manufacturer server machine to the facilitator server machine of the shopping service for selection of a fulfiller. Second, the web site of the manufacturer may have a link to the facilitator server machine of the shopping service. If so, the hobbyist may go to the manufacturer web site and select the link to access the shopping service where the hobbyist can place the product order. Third, the hobbyist may bypass the manufacturer web site altogether and go directly to the shopping service web site to place the product order.

The server machine of the shopping service (i.e., the facilitator server machine) is configured to allow the hobbyist to place a product order thereon when, for example, the hobbyist arrives at the shopping service web site. One or more manufacturer product catalogs are stored on the server machine of the shopping service to be viewed by the hobbyist. Each product catalog contains a list of products supplied by a manufacturer. The hobbyist may select one of the product catalogs to view. The hobbyist may then place a product order for one or more products listed in the selected product catalog.

Once the shopping service has received a product order, the shopping service determines a fulfiller to provide the product ordered by the hobbyist. Based on selection criteria established by the manufacturer of the ordered product, the shopping service may select the manufacturer of the product to fulfill the product order, a particular hobby shop to fulfill the product order, or offer the product order up for bid to determine which hobby shop may fulfill the product order. If the product order contains an order for more than one product, the shopping service may select any combination of fulfillers based on the manufacturer's selection criteria.

If the shopping service selects bidding as a method for selecting a hobby shop to fulfill the product order, the shopping service posts the product order on the shopping service web site for hobby shops to view. This product order may be one of many product orders posted on the shopping service web site. Those hobby shops interested in fulfilling the product order may bid on the product order. A bid communicates that a hobby shop is interested in fulfilling the product order for the predetermined price of the product(s) in the product order along with any additional shipping fees and tax costs. Based again on the manufacturer's selection criteria, the shopping service selects a hobby shop to fulfill the product order. The shopping service may select more than one hobby shop to fulfill the product order when, for example, the product order contains more than one product. The shopping service awards bids for product orders at predetermined time intervals such as daily at 3:00.

The shopping service offers each selected hobby shop the opportunity to fulfill the product order. The hobby shop then has the option to accept or reject the offer to fulfill the product order. If accepted, the hobby shop supplies the product(s) in the product order to the hobbyist.

A manufacturer may elect to distribute income to hobby shops that were unsuccessful in the bidding process. In such a case, the server machine of the shopping service (i.e., the facilitator server machine) is programmed based on criteria established by the manufacturer to give some of the income received from a product sale to hobby shops that bid on the product order but did not actually fulfill any of the product order. This is to reward hobby shops that may have in stock products similar to, but not the same as, the ordered product. For example, the manufacturer may make a widget in several different models. The product order may have been for a particular model of the widget. However, some of the hobby shops that bid on the product order may have had other models of the widget in stock but not the particular model ordered and so did not become the fulfiller. The manufacturer may nevertheless wish to reward those hobby shops by providing a percentage of the income received from the sale of the widget to those hobby shops.

Those skilled in the art will appreciate that modifications may be made to the embodiment described above without departing from the scope of the present disclosure. For example, the test to determine whether an order should be fulfilled by a manufacturer could be based on criteria other than the percentage of orders the manufacturer has fulfilled. For further example, the decision of which fulfiller (distributor or retailer) fills an order could be based on factors other than geography and additional cost, such as preferences a manufacturer has for certain retailers or distributors. Other modifications that may be made without departing from the scope of the present disclosure will be apparent to those skilled in the art. Also, although the disclosure is disclosed as a method and apparatus for processing product orders, those skilled in the art will appreciate that it has other applications as well.

The invention claimed is:

1. A method performed by a server to process a product order, the method comprising:
    operations performed by the server comprising:
        presenting to a customer an offer for the customer to purchase one or more products of a manufacturer;
        receiving a product order from the customer for the one or more products of the manufacturer;
        assigning a price the customer will pay for each product in the received product order;
        completing the received order including a check out process;
        posting the completed product order at a website accessible by one or more fulfillers using a log-in mechanism;
        waiting a selected period of time to enable the one or more fulfillers to view the posted product order;
        within the selected period of time, receiving one or more bids independent of the assigned price from the one or more fulfillers available to fulfill the product order, wherein the received one or more bids indicate an agreement by the one or more fulfillers to fulfill the posted product order; and
        at the end of the selected period of time, processing the bids received within the selected period of time to select one of the available fulfillers to fulfill the product order.

2. The method of claim 1, wherein receiving the product order comprises:
    presenting to the customer data indicative of a product catalog of the manufacturer.

3. The method of claim 1, wherein the receiving the product order comprises receiving the product order from a customer machine of the customer.

4. The method of claim 1, wherein the receiving the product order comprises receiving the product order from a manufacturer server machine of the manufacturer.

5. The method of claim 1, wherein selecting the one or more fulfillers comprises selecting one of the fulfillers to fulfill the product order based on criteria generated by the manufacturer.

6. The method of claim 1, wherein the selecting the one or more fulfillers comprises identifying a fulfiller from the one or more fulfillers that is located closest to the customer.

7. The method of claim 1, wherein the selecting the one or more fulfillers comprises comparing costs associated with each fulfiller to fulfill the product order.

8. The method of claim 1, further comprising sending an electronic message to a selected one of the fulfillers to notify the selected fulfiller that the selected fulfiller has been selected to fulfill the product order.

9. The method of claim 1, further comprising:
receiving the product order for more than one of the products of the manufacturer;
in response to the processing, selecting more than one of the fulfillers to fulfill the received product order for the more than one product of the manufacturer, each selected fulfiller fulfilling at least one product from the product order;
identifying additional shipping costs associated with selecting more than one fulfiller to fulfill the received product order;
notifying the customer of the identified additional shipping costs;
enabling the customer to send a request to cancel the product order in response to receiving the notification; and
canceling the product order when the request to cancel the purchase order is received in response to the notification of the additional shipping costs.

10. The method of claim 9, wherein selecting the more than one fulfillers comprises:
selecting one of the fulfillers to fulfill one of the more than one product; and
selecting another one of the fulfillers to fulfill another one of the more than one product.

11. The method of claim 1, wherein receiving the one or more bids comprises:
enabling the one or more fulfillers to access the website using the log-in process that includes validating a user-name and a password for each fulfiller;
in response to validating the user name and password, enabling the one or more fulfillers with validated user name and password to view the product order and one or more additional product orders available for bidding; and
enabling the one or more fulfillers with validated user name and password to bid on the product order or the one or more additional product orders.

12. The method of claim 1, further comprising:
pre-processing the completed order to determine whether to select a default fulfiller to fulfill the completed order or to allow other fulfillers to bid on the completed order.

13. A method performed by a server to process a product order, the method comprising:
operations performed by the server comprising:
presenting to a customer an offer for the customer to purchase one or more products of a manufacturer;
receiving a product order from the customer for the one or more products of the manufacturer;
assigning a price the customer will pay for each product in the received product order;
completing the received order including a check out process;
based on criteria of the manufacturer, determining whether to select the manufacturer to fulfill the completed product order or post the completed product order at a website accessible by one or more fulfillers using a log-in mechanism; and
when determining to post the completed product order based on the criteria of the manufacturer, performing operations that comprises
posting the completed product order at the website accessible by one or more fulfillers using the log-in mechanism;
waiting a selected period of time to enable the one or more fulfillers to view the posted product order;
within the selected period of time, receiving one or more bids independent of the assigned price from the one or more fulfillers available to fulfill the product order, wherein the received one or more bids indicate an agreement by the one or more fulfillers to fulfill the posted product order; and
at the end of the selected period of time, processing the bids received within the selected period of time to select one of the available fulfillers to fulfill the product order.

14. The method of claim 13, further comprising:
pre-processing the completed order to determine whether to select a default fulfiller to fulfill the completed order or to allow other fulfillers to bid on the completed order.

15. A system for processing a product order, the system comprising:
a network; and
a facilitator server coupled to the network, the facilitator server configured to:
present to a customer an offer for the customer to purchase one or more a products of a manufacturer;
receive a product order from the customer for the one or more products of the manufacturer;
assign a price the customer will pay for each product in the product order;
complete the received order including a check out process;
post the completed product order at a website accessible by one or more fulfillers using a log-in mechanism;
wait a selected period of time to enable the one or more fulfillers to view the posted product order;
within the selected period of time, receive one or more bids independent of the assigned price from the one or more fulfillers available to fulfill the product order, wherein the received one or more bids indicate an agreement by the one or more fulfillers to fulfill the posted product order; and
at the end of the selected period of time, process the bids received within the selected period of time to select one of the available fulfillers to fulfill the product.

16. The system of claim 15, wherein the facilitator server is configured to receive the product order from a client machine associated with the customer.

17. The system of claim 15, wherein the facilitator server is configured to receive the product order from a manufacturer server machine.

18. The system of claim 15, wherein the facilitator server is configured to use a selection routine to select one of the fulfillers to fulfill the product order based on criteria generated by the manufacturer.

19. The system of claim 15, wherein the facilitator server is configured to send an electronic message to a machine of the selected fulfiller over the network to notify the selected fulfiller that the selected fulfiller has been selected to fulfill the product order.

20. The system of claim 15, wherein the facilitator server is configured to:
pre-process the completed order to determine whether to select a default fulfiller to fulfill the completed order or to allow other fulfillers to bid on the completed order.

* * * * *

UNITED STATES PATENT AND TRADEMARK OFFICE
CERTIFICATE OF CORRECTION

PATENT NO. : 8,396,756 B1  Page 1 of 1
APPLICATION NO. : 10/238378
DATED : March 12, 2013
INVENTOR(S) : Edward Allen Stevens It is certified that error appears in the above-identified patent and that said Letters Patent is hereby corrected as shown below:

In the Claims:

Column 12, line 50 (claim 3), after "wherein", delete "the".

Column 12, line 53 (claim 4), after "wherein", delete "the".

Column 12, line 60 (claim 7), after "wherein", delete "the".

Column 12, line 63 (claim 8), after "wherein", delete "the".

Signed and Sealed this
Eleventh Day of June, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,396,756 B1 | Page 1 of 1 |
| APPLICATION NO. | : 10/238378 | |
| DATED | : March 12, 2013 | |
| INVENTOR(S) | : Stevens | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2393 days.

Signed and Sealed this
Second Day of December, 2014

Michelle K. Lee
*Deputy Director of the United States Patent and Trademark Office*